(12) United States Patent
Niinivaara et al.

(10) Patent No.: US 12,460,197 B2
(45) Date of Patent: Nov. 4, 2025

(54) METHODS AND COMPOSITIONS FOR ISOLATING AN ANALYTE

(71) Applicant: Gen-Probe Incorporated, San Diego, CA (US)

(72) Inventors: Anne H. Niinivaara, Vantaa (FI); Juha M. N. Saharinen, Espoo (FI); Katri M. Holappa, Espoo (FI)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

(21) Appl. No.: 19/240,880

(22) Filed: Jun. 17, 2025

(65) Prior Publication Data

US 2025/0313826 A1    Oct. 9, 2025

Related U.S. Application Data

(63) Continuation of application No. PCT/FI2023/050715, filed on Dec. 19, 2023.

(30) Foreign Application Priority Data

Dec. 21, 2022  (EP) .................................... 22306967

(51) Int. Cl.
*C12N 15/10* (2006.01)
*C12N 1/06* (2006.01)
*C12N 9/36* (2006.01)

(52) U.S. Cl.
CPC ......... *C12N 15/1017* (2013.01); *C12N 1/063* (2013.01); *C12N 1/066* (2013.01); *C12N 9/2462* (2013.01); *C12Y 302/01017* (2013.01)

(58) Field of Classification Search
None
See application file for complete search history.

(56) References Cited

U.S. PATENT DOCUMENTS 10,308,976 B2   6/2019   Van Meerbergen et al.
10,465,231 B2   11/2019  Sharma et al.
(Continued)

FOREIGN PATENT DOCUMENTS

CN   103760137 B   3/2017
CN   115961097 A   4/2023
(Continued)

OTHER PUBLICATIONS

International Search Report and Written Opinion of the International Searching Authority mailed Feb. 29, 2024, issued in corresponding International Application No. PCT/FI2023/050715, filed Dec. 19, 2023, 19 pages.
(Continued)

*Primary Examiner* — Aaron A Priest
(74) *Attorney, Agent, or Firm* — Sherbina Intellectual Property Law, PLLC; Nicholas V. Sherbina; Jeffrey E. Landes

(57) ABSTRACT

Disclosed are methods for isolating an analyte from a sample. In some aspects, the methods are for selectively isolating a microbial cell analyte, such as a nucleic acid, from a sample containing or suspected of containing mammalian cells. The selective isolation method includes selective lysis of the mammalian cells and filtration of the resulting lysate through a filter that retains intact microbial cells, followed by on-filter lysis of the retained microbial cells to release the microbial cell analyte. The released analyte is then eluted from the filter. In other aspects, the methods utilize on-filter lysis of a sample containing intact cells (e.g., microbial cells) to release the analytes, followed by elution of the released analytes from the filter by passing an immiscible liquid through the filter. The isolated analytes may be analyzed using a suitable assay depending on the type of analyte molecule. Also disclosed are fluidic systems
(Continued)

and lysis solutions that may be used for isolating an analyte according to the disclosed methods.

24 Claims, 4 Drawing Sheets

(56) References Cited

U.S. PATENT DOCUMENTS

| | | | |
|---|---|---|---|
| 10,975,418 B1 * | 4/2021 | Wang | C12Q 1/6806 |
| 2008/0193912 A1 | 8/2008 | Fang et al. | |
| 2015/0167053 A1 | 6/2015 | Mertz et al. | |
| 2016/0186167 A1 | 6/2016 | Faltin et al. | |

FOREIGN PATENT DOCUMENTS

| | | |
|---|---|---|
| CN | 116590380 A | 8/2023 |
| DE | 102005009479 A1 | 9/2006 |
| EP | 2049677 B1 | 7/2011 |
| EP | 2510123 B2 | 1/2019 |
| EP | 3456839 A1 | 3/2019 |
| EP | 3314008 B1 | 12/2019 |
| WO | 2012168003 A1 | 12/2012 |
| WO | 2016169579 A1 | 10/2016 |
| WO | 2017182775 A1 | 10/2017 |
| WO | 2018169754 A1 | 9/2018 |
| WO | 2019141874 A1 | 7/2019 |
| WO | 2021100931 A1 | 5/2021 |

OTHER PUBLICATIONS

Guan, B., et al., "Sensitive extraction-free SARS-CoV-2 RNA virus detection using a chelating resin," iScience 24, 102960, Sep. 24, 2021.

Du, L., et al., "Preparation of Water Soluble Yeast Glucan by Four Kinds of Solubilizing Processes," Engineering 5:184-188, Oct. 2012.

Truett, G.E., et al. "Preparation of PCR-Quality Mouse Genomic DNA with Hot Sodium Hydroxide and Tris (HotSHOT)," BioTechniques 29:52-54, Jul. 2000.

Williams, D.L., et al., "A method for the solubilization of a (1 + 3)-beta-D-glucan isolated from *Saccharomyces cerevisiae*," Carbohydr. Res. 219:203-213, 1991.

Yee, B., et al., "Biological Effects of Dimethyl Sulfoxide on Yeast,"Biochem. Biophys. Res. Commun. 49:1336-1342, 1972.

* cited by examiner

METHODS AND COMPOSITIONS FOR ISOLATING AN ANALYTE

CROSS-REFERENCE(S) TO RELATED APPLICATION(S)

This application is a continuation of International Application No. PCT/FI2023/050715, filed Dec. 19, 2023, which claims priority to European Application No. 22306967.5, filed Dec. 21, 2022, each of which is incorporated by reference herein in its entirety.

BACKGROUND

Many molecular diagnostics applications require the best possible sensitivity for being state-of the-art and competitive with products from other molecular diagnostics manufacturers. High sensitivity is a definite asset of typically all molecular diagnostics applications and a feature typically evaluated by the end-user.

In addition, certain cases pose sensitivity requirements that cannot be achieved by any typical sample extraction method, regardless of their sensitivity, due to a low number of analyte molecules in the volume of the sample used for extraction. Some applications in this area include direct blood sepsis pathogen detection, liquid biopsies for circulating tumor cells (CTCs), circulating tumor DNA and exosomes (from, e.g., blood/plasma and urine matrices) as well as, e.g., water analytics and airborne pathogen detection.

For example, direct blood sample microbe detection would have immense value due to faster overall result of the pathogen presence, identification, and, e.g., antibiotics resistance properties. The current gold standard method is based on pathogen enrichment by blood culturing, which is both time consuming (e.g., 24-72 hours) and with low detection sensitivity even after culturing. Worldwide, approximately 30 million sepsis cases emerge annually, leading to 7-9 million deaths (one death every 3.5 seconds). The published data indicate an 8% decrease in survival rate for every hour of delayed antibiotics administration in sepsis, and that 15-40% of the sepsis patients receive inappropriate empirical antibiotics treatment due to inability to detect the causative pathogen promptly, underlining the importance of early pathogen detection, identification, and antibiotics resistance profiling.

In the field of direct blood sepsis testing, nucleic acid-based assays utilizing pathogen enrichment from the blood sample have been developed by Qvell, T2 Biosystems, and DNAe. All these assays are based on multiplex PCR, preceded by pathogen enrichment from the blood sample. The DNAe assay uses magnetic particles coupled with pathogen-specific antibodies, while the T2 Biosystems and Qvell assays use centrifugation for enrichment. The use of biomolecules such as antibodies for sample enrichment poses issues with storage/stability, lot-to-lot variation, and cost in addition to the incubation time. The use of centrifugation in a closed system results in bulky instruments and specific fluidics capable of retaining the correct fraction of the centrifugate.

There is a need for sample enrichment methods in various application areas that enable, for example, analyte detection sensitivity beyond what is achievable by conventional methods, as well as increased efficiency of cost, assay time, and instrumentation space.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Systems and methods described herein are based on using selective filtering to enrich an analyte from a larger volume of the original sample. In this manner, overall assay sensitivity can be improved by processing a larger sample volume. The concept is applicable to molecular diagnostics with downstream nucleic acid (e.g., RNA/DNA) amplification and detection by qPCR and/or microarray, but also for other detection modalities, including next-generation sequencing as well as for protein/other biomolecule detection by for example ELISA, protein arrays, MALDI-TOF, nanoLC/UPLC-ESI-MS, and other relevant amplification/separation/detection modalities.

In one aspect, the present disclosure provides a method for selectively isolating a microbial cell analyte (for example, a microbial cell nucleic acid) from a sample containing mammalian cells and potentially containing microbial cells. The method generally includes (a) providing a sample containing mammalian (e.g., human) cells and potentially containing microbial cells; (b) mixing the sample with a first lysis solution that selectively lyses the mammalian cells to obtain a first lysate containing lysed mammalian cells and intact microbial cells, if present; (c) filtering the first lysate through a filter having a pore size that retains the intact microbial cells; (d) contacting the filter containing the retained microbial cells with a second lysis solution that is effective to lyse the microbial cells and release therefrom an analyte; (e) providing conditions for lysing the retained microbial cells in the second lysis solution whereby at least a portion of the microbial cells are lysed and the analyte released therefrom; and (f) eluting the analyte from the filter to obtain an eluate comprising isolated analyte. In some embodiments, the microbial cells are bacterial cells or yeast cells. In other, non-mutually exclusive variations, the mammalian cells are blood cells.

Particularly suitable filters for use in the method include filters comprising polyethersulfone (PES), cellulose, nylon, polyvinylidene fluoride (Poly(1,1-difluoroethylene), PVDF), polycarbonate, or glass (e.g., borosilicate glass) fiber. In certain variations, the filter has a pore size of about 1 µm or less (e.g., a pore size of from about 0.1 µm to about 1 µm, a pore size of from about 0.2 to about 1 µm, or a pore size of about 0.22 µm). In other, non-mutually exclusive variations, the filter comprises an asymmetric structure. In certain variations, pores on a first side of the asymmetric filter have a size from about 5 µm to about m and pores on a second side of the asymmetric filter have a size of up to about 0.2 µm.

In some embodiments of a method as above, the first lysis solution comprises a chaotropic salt and a detergent. In some such embodiments, the chaotropic salt is guanidine hydrochloride and/or the detergent is saponin. In certain variations, the first lysis solution further includes a second detergent such as, e.g., polysorbate 20.

In some embodiments of a method as above, the first lysis solution comprises guanidine hydrochloride, polysorbate 20, saponin, and a buffer. In some such embodiments, guanidine hydrochloride is present in the first lysis solution at a concentration of from about 1 M to about 8 M; polysorbate 20 is present in the first lysis solution at a concentration of from 1% (v/v) to about 10% (v/v); saponin is present in the first lysis solution at a concentration of from about 1% (w/v) to about 10% (w/v); and/or the buffer in the first lysis solution is Tris and is present at a concentration of from about 20 mM to about 200 mM. In more specific variations, guanidine hydrochloride is present in the first lysis solution at a concentration of about 4 M; polysorbate 20 is present in the first lysis solution at a concentration of 4% (v/v); saponin is present in the first lysis solution at a concentration of about 4% (w/v); and/or Tris is present in the first lysis solution at a concentration of from about 35 mM to about 45 mM (e.g., about 40.5 mM).

In certain variations of a method as above, the volume of the sample provided at step (a) is from about 0.5 mL to about 5 mL. In more specific variations, the volume of the sample is from about 1 mL to about 5 mL or from about 2 mL to about 5 mL (e.g., about 4 mL).

In certain embodiments of a method as above, the ratio of the first lysis solution to the sample during the mixing step (b) is about 1:1. In other, non-mutually exclusive variations, the concentration of guanidine hydrochloride in the first lysate is from about 0.5 M to about 4 M; the concentration of polysorbate 20 in the first lysate is from about 0.5% (v/v) to about 5% (v/v); the concentration of saponin in the first lysate is from about 0.5% (w/v) to about 5% (w/v); and/or the buffer in the first lysis solution is Tris and the concentration of Tris in the first lysate is from about 10 mM to about 100 mM. In some such variations, the concentration of guanidine hydrochloride in the first lysate is about 2 M; the concentration of polysorbate 20 in the first lysate is about 2% (v/v); the concentration of saponin in the first lysate is about 2% (w/v); and/or the buffer in the first lysis solution is Tris and the concentration of Tris in the first lysate is from about 18 mM to about 23 mM (e.g., about 20.25 mM).

In some embodiments of a method as above, the second lysis solution comprises sodium hydroxide, dimethyl sulfoxide (DMSO), glycerol, and a buffer. In some such embodiments, sodium hydroxide is present in the second lysis solution at a concentration of from about 20 mM to about 500 mM; DMSO is present in the second lysis solution at a concentration of from about 5% (v/v) to about 30% (v/v); glycerol is present in the second lysis solution at a concentration of from about 1% (v/v) to about 15% (v/v); and/or the buffer in the second lysis solution is Tris and is present at a concentration of from about 1 mM to about 50 mM. In more specific variations, sodium hydroxide is present in the second lysis solution at a concentration of from about 50 mM to about 100 mM; DMSO is present in the second lysis solution at a concentration of from about 10% (v/v) to about 25% (v/v); glycerol is present in the second lysis solution at a concentration of from about 3% (v/v) to about 10% (v/v); and/or the buffer in the second lysis solution is Tris and is present at a concentration of from about 5 mM to about 10 mM. In still more specific variations, sodium hydroxide is present in the second lysis solution at a concentration of about 85 mM; DMSO is present in the second lysis solution at a concentration of about 18% (v/v); glycerol is present in the second lysis solution at a concentration of about 7% (v/v); and/or the buffer in the second lysis solution is Tris and is present at a concentration of from about 5 mM to about 10 mM (e.g., about 7.5 mM). In some variations, the second lysis solution further comprises a chelating agent. A particularly suitable chelating agent is 2,2',2'',2'''-(Ethane-1,2-diyldinitrilo)tetraacetic acid (EDTA), which may be present in the second lysis solution at a concentration of from about 0.1 mM to about 4 mM, from about 0.5 mM to about 2 mM, or about 1 mM. In some embodiments, a second lysis solution as above consists or consists essentially of sodium hydroxide, DMSO, glycerol, the chelating agent, the buffer, and water.

In certain variations of a method as above, the lysing conditions of step (e) comprise incubating the filter with the second lysis solution at a temperature of from about 80° C. to about 150° C. (e.g., a temperature of from about 90° C. to about 130° C.). In other, non-mutually exclusive embodiments, the lysing conditions of step (e) comprise sonication.

In certain embodiments, a method as above further includes an enzymatic treatment step between steps (c) and (d), wherein the enzymatic treatment step comprises contacting the filter containing the retained microbial cells with an enzyme that is effective to degrade one or more microbial cell wall components (e.g., peptidoglycan, chitin, proteins). A particularly suitable enzyme is mutanolysin, lyticase, lysozyme, endoglucanase, protease, chitinase, and combinations thereof.

In some variations of a method as above, the eluting step (f) includes passing an immiscible liquid (e.g., oils and/or hydrocarbons, such as mineral oil, silicone oil, or hexadecane) through the filter to push the eluate containing the analyte out of the filter. In some such embodiments, the method further includes separating the eluate from the immiscible liquid. In other variations, the elution step (f) includes using the second lysis solution as an elution buffer, wherein the elution buffer is passed through the filter to obtain the eluate containing the nucleic acids. The direction of fluid flow through the filter in the elution step (f) may be the same as or opposite the direction of fluid flow applied in the filtering step (c).

In certain embodiments, a method as above further includes (g) adding a neutralizing buffer to the eluate obtained in step (f). In some such embodiments, the neutralizing buffer may comprise hydrochloric acid (HCl) and Tris.

In some embodiments, a method as above further includes a washing step between steps (c) and (d), wherein the washing step comprises flowing a wash buffer through the filter. A particularly suitable wash buffer comprises polysorbate 20, EDTA, and Tris. In other embodiments, the wash buffer is the same as the second lysis solution or a diluted concentration of the second lysis solution. In alternative variations, the method does not comprise a washing step between steps (c) and (d). In certain variations comprising a washing step between steps (c) and (d) wherein the method further comprises an enzymatic treatment step between steps (c) and (d) as described above, the washing step is performed before the enzymatic treatment step.

A method as above may further include analyzing the isolated analyte. For example, where the isolated analyte is a nucleic acid, steps for analyzing the isolated nucleic acid may include (i) performing an amplification reaction using the isolated nucleic acid as a template to generate an amplification product; and (ii) detecting the amplification product. In some such embodiments, the amplification reaction is PCR such as, e.g., quantitative PCR (qPCR). In other variations, the amplification is an isothermal amplification reaction such as, e.g., a transcription-mediated amplification reaction. The detection step (ii) may be performed in real time. The method may optionally include an analyte isolation/purification step for isolating a target analyte of interest from non-target analytes among the microbial analyte.

In some embodiments of a method as above and further comprising analyzing an isolated nucleic acid analyte, the analyzing step includes immobilizing the isolated nucleic acid or amplification product on a solid support. In some such embodiments, the isolated nucleic acid or amplification product is hybridized to an immobilized probe attached to the solid support such as, for example, an immobilized probe contained within a nucleic acid array.

In another aspect, the present disclosure provides a fluidic system, which may be a microfluidic system, configured for selectively isolating a microbial cell analyte from a sample according to a method as described above. The system generally includes (1) an input port configured to receive the sample; (2) a first reservoir for the first lysis solution; (3) a lysing chamber for mixing the sample with the first lysis solution to obtain the first lysate; (4) a filter chamber containing the filter; (5) a second reservoir for the second lysis solution; (6) a third reservoir for an elution reagent that is effective to elute the released analyte from the filter; (7) an elution chamber for receiving the eluate; and (8) a fluid channel arrangement configured to provide (a) fluid communication between the lysing chamber and each of the inlet port and the first reservoir and (b) fluid communication between the filter chamber and each of the lysing chamber, the second and third reservoirs, and the elution chamber. In some embodiments, the fluidic system further includes a heater thermally coupled to the filter chamber, a sonotrode coupled to the filter chamber, or conductive mesh structures placed on one or both sides of the filter chamber. In other, non-mutually exclusive variations, the fluidic system further includes one or both of (i) a fourth reservoir for a neutralizing buffer, wherein the fluid channel arrangement further provides fluid communication between the elution chamber and the fourth reservoir, and (ii) a fifth reservoir for a wash buffer, wherein the fluid channel arrangement further provides fluid communication between the filter chamber and the fifth reservoir. In yet other non-mutually exclusive embodiments, the fluidic system further includes one or both of the first lysis solution and the second lysis solution (e.g., a first lysis solution comprising guanidine hydrochloride at a concentration of from about 1 M to about 8 M, polysorbate 20 at a concentration of from about 0.5% (v/v) to about 5% (v/v), saponin at a concentration of from about 0.5% (w/v) to about 5% (w/v), and Tris at a concentration of from about 10 mM to about 100 mM; and/or a second lysis solution comprising sodium hydroxide at a concentration of from about 20 mM to about 500 mM, dimethyl sulfoxide (DMSO) at a concentration of from about 5% (v/v) to about 30% (v/v), glycerol at a concentration of from about 1% (v/v) to about 15% (v/v), 2,2',2'',2'''-(Ethane-1,2-diyldinitrilo)tetraacetic acid (EDTA) at a concentration of from about 0.1 mM to about 4 mM, and Tris at a concentration of from about 1 mM to about 50 mM.

In another aspect, the present disclosure provides a method for isolating an analyte (e.g., a nucleic acid) from a sample using immiscible fluid elution. The method generally includes (a) providing a sample potentially containing intact cells; (b) filtering the sample through a filter having a pore size that retains the intact cells; (c) contacting the filter containing the retained cells with a lysis solution that is effective to lyse the cells and release therefrom an analyte; (d) providing conditions for lysing the retained cells in the lysis solution whereby at least a portion of the cells are lysed and the analyte released therefrom; and (e) passing an immiscible liquid through the filter to push an eluate containing the analyte out of the filter. The direction of fluid flow through the filter in the elution step (e) may be the same as or opposite the direction of fluid flow applied in the filtering step (b). The method may further includes (f) adding a neutralizing buffer (e.g., a buffer comprising hydrochloric acid (HCl) and Tris) to the eluate obtained in step (e). In some embodiments, the method further includes separating the eluate from the immiscible liquid. In other non-mutually exclusive variations, the immiscible liquid is selected from the group consisting of oils and hydrocarbons, such as mineral oil, silicone oil, and hexadecane. Particularly suitable filters for use in the method include filters comprising polyethersulfone (PES), cellulose, nylon, polyvinylidene fluoride (PVDF), polycarbonate, or glass (e.g., borosilicate glass) fiber. In certain variations, the filter has a pore size of about 1 μm or less (e.g., a pore size of from about 0.1 μm to about 1 μm, a pore size of from about 0.2 to about 1 μm, or a pore size of about 0.22 m). In other, non-mutually exclusive variations, the filter comprises an asymmetric structure. In certain variations, pores on a first side of the asymmetric filter have a size from about 5 μm to about 20 μm and pores on a second side of the asymmetric filter have a size of up to about 0.2 μm.

In some embodiments of a method for isolating an analyte from a sample using immiscible fluid elution as above, the cells are microbial cells such as, for example, bacterial or yeast cells. In some embodiments wherein the cells are microbial cells, the lysis solution at step (c) comprises sodium hydroxide, dimethyl sulfoxide (DMSO), glycerol, and a buffer. In some such embodiments, sodium hydroxide is present in the lysis solution at a concentration of from about 20 mM to about 500 mM; DMSO is present in the lysis solution at a concentration of from about 5% (v/v) to about 30% (v/v); glycerol is present in the lysis solution at a concentration of from about 1% (v/v) to about 15% (v/v); and/or the buffer in the lysis solution is Tris and is present at a concentration of from about 1 mM to about 50 mM. In more specific variations, sodium hydroxide is present in the lysis solution at a concentration of from about 50 mM to about 100 mM; DMSO is present in the lysis solution at a concentration of from about 10% (v/v) to about 25% (v/v); glycerol is present in the lysis solution at a concentration of from about 3% (v/v) to about 10% (v/v); and/or the buffer in the lysis solution is Tris and is present at a concentration of from about 5 mM to about 10 mM. In still more specific variations, sodium hydroxide is present in the lysis solution at a concentration of about 85 mM; DMSO is present in the lysis solution at a concentration of about 18% (v/v); glycerol is present in the lysis solution at a concentration of about 7% (v/v); the chelating agent in the lysis solution is EDTA and is present at a concentration of about 1 mM; and/or the buffer in the lysis solution is Tris and is present at a concentration of from about 5 mM to about 10 mM (e.g., about 7.5 mM). In some variations, the lysis solution further comprises a chelating agent. In some such variations, the chelating agent is 2,2',2'',2'''-(Ethane-1,2-diyldinitrilo)tetraacetic acid (EDTA) and is present in the lysis solution at a concentration of from about 0.1 mM to about 4 mM, from about 0.5 mM to about 2 mM, or about 1 mM. In some embodiments, a lysis solution as above consists or consists essentially of sodium hydroxide, DMSO, glycerol, the chelating agent, the buffer, and water.

In certain, non-mutually exclusive variations, the lysing conditions of step (d) comprise incubating the filter with the lysis solution at a temperature of from about 80° C. to about 150° C. (e.g., a temperature of from about 90° C. to about 130° C.). In other, non-mutually exclusive embodiments, the lysing conditions of step (d) comprise sonication.

In certain embodiments of a method for isolating an analyte from a sample using immiscible fluid elution as above and wherein the cells are microbial cells, the method further includes an enzymatic treatment step between steps (b) and (c), wherein the enzymatic treatment step comprises contacting the filter containing the retained microbial cells with an enzyme that is effective to degrade one or more microbial cell wall components (e.g., peptidoglycan, chitin, proteins). A particularly suitable enzyme is mutanolysin, lyticase, lysozyme, endoglucanase, protease, chitinase, and combinations thereof.

In some embodiments of a method for isolating an analyte from a sample using immiscible fluid elution as above and wherein the cells are microbial cells, the method further includes a selective lysis step before step (b), wherein the selective lysis step comprises selectively lysing any mammalian (e.g., human) cells in the sample while leaving the microbial cells intact. In some such variations, the mammalian cells in the sample are blood cells.

In some embodiments of a method for isolating an analyte from a sample using immiscible fluid elution as above, the method further includes a washing step between steps (b) and (c), wherein the washing step comprises flowing a wash buffer through the filter. A particularly suitable wash buffer comprises EDTA and Tris and may also include polysorbate 20. In other embodiments, the wash buffer is the same as the lysis solution or is a diluted concentration of the lysis solution. In alternative variations, the method does not comprise a washing step between steps (b) and (c). In certain variations comprising a washing step between steps (b) and (c) wherein the method further comprises an enzymatic treatment step between steps (b) and (c) as described above, the washing step is performed before the enzymatic treatment step.

A method for isolating an analyte from a sample using immiscible fluid elution as above may further include analyzing the isolated analyte. For example, where the isolated analyte is a nucleic acid, steps for analyzing the isolated nucleic acid may include (i) performing an amplification reaction using the isolated nucleic acid as a template to generate an amplification product; and (ii) detecting the amplification product. In some such embodiments, the amplification reaction is PCR such as, e.g., quantitative PCR (qPCR). In other variations, the amplification is an isothermal amplification reaction such as, e.g., a transcription-mediated amplification reaction. The detection step (ii) may be performed in real time. In some embodiments, the analyzing step includes immobilizing the isolated nucleic acid or amplification product on a solid support; in some such embodiments, the isolated nucleic acid or amplification product is hybridized to an immobilized probe attached to the solid support such as, for example, an immobilized probe contained within a nucleic acid array.

In another aspect, the present invention provides a lysis solution as described above. In some embodiments, the lysis solution is a buffered lysis solution that is effective to lyse the microbial cells and release therefrom an analyte, the lysis solution comprising sodium hydroxide at a concentration of from about 20 mM to about 500 mM, dimethyl sulfoxide (DMSO) at a concentration of from about 5% (v/v) to about 30% (v/v), glycerol at a concentration of from about 1% (v/v) to about 15% (v/v), and a buffer. In more specific variations, sodium hydroxide is present at a concentration of from about 50 mM to about 100 mM (e.g., about 85 mM); DMSO is present at a concentration of from about 10% (v/v) to about 25% (v/v) (e.g., about 18% (v/v)); and/or glycerol is present at a concentration of from about 3% (v/v) to about 10% (v/v) (e.g., about 7% (v/v)). In still more specific variations, sodium hydroxide is present at a concentration of about 85 mM; DMSO is present at a concentration of about 18% (v/v); and/or glycerol is present at a concentration of about 7% (v/v). In certain embodiments, the buffer is Tris and is present at a concentration of from about 1 mM to about 50 mM or about 5 mM to about 10 mM (e.g., about 7.5 mM). In some variations, the lysis solution further comprises a chelating agent. A particularly suitable chelating agent is 2,2',2'',2'''-(Ethane-1,2-diyldinitrilo)tetraacetic acid (EDTA), which may be present at a concentration of from about 0.1 mM to about 4 mM, from about 0.5 mM to about 2 mM, or about 1 mM. In some embodiments, a lysis solution as above consists or consists essentially of sodium hydroxide, DMSO, glycerol, the chelating agent, the buffer, and water.

These and other aspects of the invention will become evident upon reference to the following detailed description.

DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

The foregoing aspects and many of the attendant advantages of this invention will become more readily appreciated as the same become better understood by reference to the following detailed description, when taken in conjunction with the accompanying drawings, wherein.

EMBODIMENTS

Figure 1:
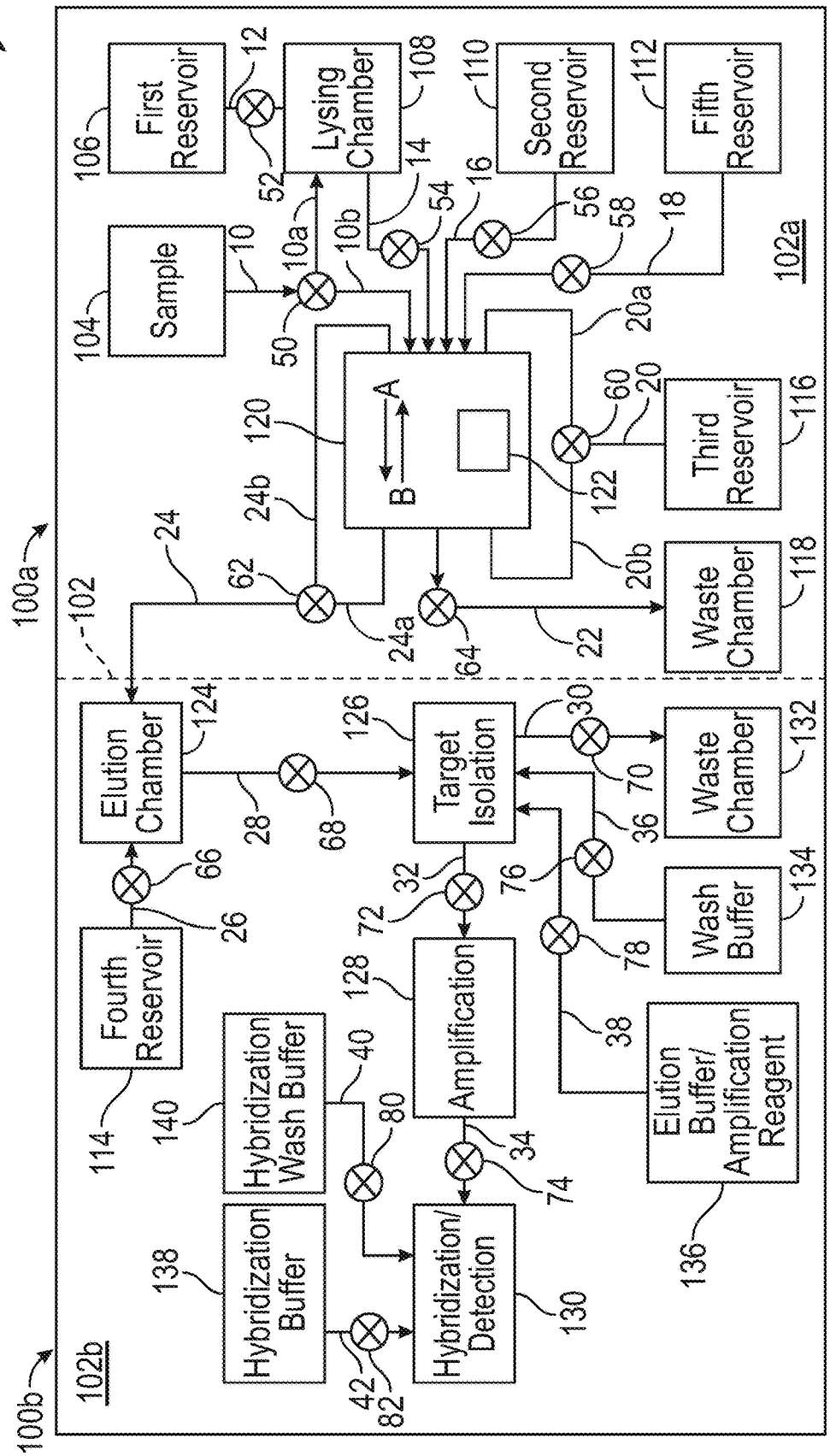
FIG. 1 is a schematic drawing of a fluidic system 100 for isolating an analyte from a sample using a method described herein and for analyzing an isolated analyte to detect whether the sample includes an analyte of interest.

Embodiment 1: A method for selectively isolating a microbial cell analyte from a sample, the method comprising: (a) providing a sample containing mammalian cells and potentially containing microbial cells; (b) mixing the sample with a first lysis solution that selectively lyses the mammalian cells to obtain a first lysate containing lysed mammalian cells and intact microbial cells, if present; (c) filtering the first lysate through a filter having a pore size that retains the intact microbial cells; (d) contacting the filter containing the retained microbial cells with a second lysis solution that is effective to lyse the microbial cells and release therefrom an analyte; (e) providing conditions for lysing the retained microbial cells in the second lysis solution whereby at least a portion of the microbial cells are lysed and the analyte released therefrom; and (f) eluting the analyte from the filter to obtain an eluate comprising isolated analyte.

Embodiment 2: The method of embodiment 1, wherein the microbial cells are bacterial cells.

Embodiment 3: The method of embodiment 1, wherein the microbial cells are yeast cells.

Embodiment 4: The method of any one of embodiments 1 to 3, wherein the filter has a pore size of about 1 μm or less.

Embodiment 5: The method of embodiment 4, wherein the filter has a pore size of from about 0.1 μm to about 1 μm.

Embodiment 6: The method of embodiment 4, wherein the filter has a pore size of from about 0.2 μm to about 1 μm.

Embodiment 7: The method of embodiment 6, wherein the filter has a pore size of about 0.22 μm.

Embodiment 8: The method of any one of embodiments 1 to 7, wherein the filter comprises polyethersulfone (PES), cellulose, nylon, polyvinylidene fluoride (PVDF), polycarbonate, or glass fiber.

Embodiment 9: The method of any one of embodiments 1 to 8, wherein the filter comprises an asymmetric structure, and, preferably, the asymmetric filter comprises pores on a first side having a size from about 5 μm to about 20 μm and pores on a second side having a size of up to about 0.2 μm.

Embodiment 10: The method of any one of embodiments 1 to 9, wherein the first lysis solution comprises a chaotropic salt and a detergent.

Embodiment 11: The method of embodiment 10, wherein the chaotropic salt is guanidine hydrochloride.

Embodiment 12: The method of embodiment 10 or 11, wherein the detergent is saponin.

Embodiment 13: The method of embodiment 12, wherein the first lysis solution further comprises a second detergent.

Embodiment 14: The method of embodiment 13, wherein the second detergent is polysorbate 20.

Embodiment 15: The method of any one of embodiments 1 to 9, wherein the first lysis solution comprises guanidine hydrochloride, polysorbate 20, saponin, and a buffer.

Embodiment 16: The method of embodiment 15, wherein guanidine hydrochloride is present in the first lysis solution at a concentration of from about 1 M to about 8 M.

Embodiment 17: The method of embodiment 16, wherein guanidine hydrochloride is present in the first lysis solution at a concentration of about 4 M.

Embodiment 18: The method of any one of embodiments 15 to 17, wherein polysorbate 20 is present in the first lysis solution at a concentration of from about 1% (v/v) to about 10% (v/v).

Embodiment 19: The method of embodiment 18, wherein polysorbate 20 is present in the first lysis solution at a concentration of 4% (v/v).

Embodiment 20: The method of any one of embodiments 15 to 19, wherein saponin is present in the first lysis solution at a concentration of from about 1% (w/v) to about 10% (w/v).

Embodiment 21: The method of any embodiment 20, wherein saponin is present in the first lysis solution at a concentration of about 4% (w/v).

Embodiment 22: The method of any one of embodiments 15 to 21, wherein the buffer in the first lysis solution is Tris and is present at a concentration of from about 20 mM to about 200 mM.

Embodiment 23: The method of embodiment 22, wherein Tris is present in the first lysis solution at a concentration of from about 35 mM to about 45 mM.

Embodiment 24: The method of any one of embodiments 1 to 23, wherein the volume of the sample provided at step (a) is from about 0.5 mL to about 5 mL.

Embodiment 25: The method of embodiment 24, wherein the volume of the sample provided at step (a) is from about 1 mL to about 5 mL.

Embodiment 26: The method of embodiment 24, wherein the volume of the sample provided at step (a) is about 4 mL.

Embodiment 27: The method of any one of embodiments 1 to 26, wherein during the mixing step (b) the ratio of the first lysis solution to the sample is about 1:1.

Embodiment 28: The method of embodiment 15, wherein the concentration of guanidine hydrochloride in the first lysate is from about 0.5 M to about 4 M.

Embodiment 29: The method of embodiment 28, wherein the concentration of guanidine hydrochloride in the first lysate is about 2 M.

Embodiment 30: The method of any one of embodiments 15, 28, and 29, wherein the concentration of polysorbate 20 in the first lysate is from about 0.5% (v/v) to about 5% (v/v).

Embodiment 31: The method of embodiment 30, wherein the concentration of polysorbate 20 in the first lysate is about 2% (v/v).

Embodiment 32: The method of any one of embodiments 15 and 28 to 31, wherein the concentration of saponin in the first lysate is from about 0.5% (w/v) to about 5% (w/v).

Embodiment 33: The method of embodiment 32, wherein the concentration of saponin in the first lysate is about 2% (w/v).

Embodiment 34: The method of any one of embodiments 15 and 28 to 33, wherein the buffer in the first lysis solution is Tris and the concentration of Tris in the first lysate is from about 10 mM to about 100 mM.

Embodiment 35: The method of embodiment 34, wherein the concentration of Tris in the first lysate is from about 18 mM to about 23 mM.

Embodiment 36: The method of any one of embodiments 1 to 35, wherein the second lysis solution comprises sodium hydroxide, dimethyl sulfoxide (DMSO), glycerol, and a buffer.

Embodiment 37: The method of embodiment 36, wherein sodium hydroxide is present in the second lysis solution at a concentration of from about 20 mM to about 500 mM.

Embodiment 38: The method of embodiment 37, wherein sodium hydroxide is present in the second lysis solution at a concentration of from about 50 mM to about 100 mM.

Embodiment 39: The method of embodiment 37, wherein sodium hydroxide is present in the second lysis solution at a concentration of about 85 mM.

Embodiment 40: The method of any one of embodiments 36 to 39, wherein DMSO is present in the second lysis solution at a concentration of from about 5% (v/v) to about 30% (v/v).

Embodiment 41: The method of embodiment 40, wherein DMSO is present in the second lysis solution at a concentration of from about 10% (v/v) to about 25% (v/v).

Embodiment 42: The method of embodiment 40, wherein DMSO is present in the second lysis solution at a concentration of about 18% (v/v).

Embodiment 43: The method of any one of embodiments 36 to 42, wherein glycerol is present in the second lysis solution at a concentration of from about 1% (v/v) to about 15% (v/v).

Embodiment 44: The method of embodiment 43, wherein glycerol is present in the second lysis solution at a concentration of from about 3% (v/v) to about 10% (v/v).

Embodiment 45: The method of any one of embodiments 43, wherein glycerol is present in the second lysis solution at a concentration of about 7% (v/v).

Embodiment 46: The method of any one of embodiments 36 to 45, wherein the buffer in the second lysis solution is Tris and is present at a concentration of from about 1 mM to about 50 mM.

Embodiment 47: The method of embodiment 46, wherein Tris is present in the second lysis solution at a concentration of from about 5 mM to about 10 mM.

Embodiment 48: The method of any one of embodiments 36 to 47, wherein the second lysis solution further comprises a chelating agent.

Embodiment 49: The method of embodiment 48, wherein the chelating agent in the second lysis solution is 2,2',2",2'''-(Ethane-1,2-diyldinitrilo)tetraacetic acid (EDTA) and is present at a concentration of from about 0.1 mM to about 4 mM.

Embodiment 50: The method of embodiment 49, wherein EDTA is present in the second lysis solution at a concentration of from about 0.5 mM to about 2 mM.

Embodiment 51: The method of embodiment 49, wherein EDTA is present in the second lysis solution at a concentration of about 1 mM.

Embodiment 52: The method of any one of embodiments 1 to 51, wherein the conditions for lysing of step (e) comprise incubating the filter with the second lysis solution at an incubation temperature of from about 80° C. to about 150° C.

Embodiment 53: The method of embodiment 52, wherein the incubation temperature is from about 90° C. to about 130° C.

Embodiment 54: The method of any one of embodiments 1 to 53, wherein the lysing conditions of step (e) comprise sonication and/or ultrasound and/or electrolysis.

Embodiment 55: The method of any one of embodiments 1 to 54, wherein the eluting step (f) comprises passing an immiscible liquid through the filter to push the eluate comprising the analyte out of the filter.

Embodiment 56: The method of embodiment 55, wherein the immiscible liquid is selected from the group consisting of oils and hydrocarbons.

Embodiment 57: The method of embodiment 55 or 56, further comprising separating the eluate from the immiscible liquid.

Embodiment 58: The method of any one of embodiments 1 to 54, wherein the eluting step (f) comprises using the second lysis solution as an elution buffer, wherein said elution buffer is passed through the filter to obtain the eluate comprising the nucleic acids.

Embodiment 59: The method of any one of embodiments 1 to 58, wherein the direction of fluid flow through the filter in the eluting step (f) is the same as the direction of fluid flow applied in the filtering step (c).

Embodiment 60: The method of any one of embodiments 1 to 58, wherein the direction of fluid flow through the filter in the eluting step (f) is opposite the direction of fluid flow applied in the filtering step (c).

Embodiment 61: The method of any one of embodiments 1 to 60, further comprising (g) adding a neutralizing buffer to the eluate obtained in step (f).

Embodiment 62: The method of embodiment 61, wherein the neutralizing buffer comprises hydrochloric acid (HCl) and Tris.

Embodiment 63: The method of any one of embodiments 1 to 62, further comprising a washing step between steps (c) and (d), wherein the washing step comprises flowing a wash buffer through the filter.

Embodiment 64: The method of embodiment 63, wherein the wash buffer comprises EDTA and Tris and optionally polysorbate 20.

Embodiment 65: The method of embodiment 63, wherein the wash buffer is the same as the second lysis solution or is a diluted concentration of the second lysis solution.

Embodiment 66: The method of any one of embodiments 1 to 62, wherein the method does not comprise a washing step between steps (c) and (d).

Embodiment 67: The method of any one of embodiments 1 to 66, wherein the mammalian cells are human cells.

Embodiment 68: The method of any one of embodiments 1 to 67, wherein the mammalian cells are blood cells.

Embodiment 69: The method of any one of embodiments 1 to 68, wherein the analyte is a nucleic acid.

Embodiment 70: The method of any one of embodiments 1 to 69, further comprising analyzing the isolated analyte.

Embodiment 71: The method of embodiment 69, further comprising analyzing the isolated nucleic acid.

Embodiment 72: The method of embodiment 71, wherein analyzing the isolated nucleic acid comprises: (i) performing an amplification reaction using the isolated nucleic acid as a template to generate an amplification product; and (ii) detecting the amplification product.

Embodiment 73: The method of embodiment 72, wherein the amplification reaction is PCR.

Embodiment 74: The method of embodiment 72, wherein the amplification reaction is an isothermal amplification reaction.

Embodiment 75: The method of embodiment 74, wherein the isothermal amplification reaction is a transcription-mediated amplification reaction.

Embodiment 76: The method of any one of embodiments 72 to 75, wherein the detecting step (ii) is performed in real time.

Embodiment 77: The method of any one of embodiments 72 to 75, wherein analyzing the isolated nucleic acid comprises immobilizing the isolated nucleic acid or amplification product on a solid support.

Embodiment 78: The method of embodiment 77, wherein the isolated nucleic acid or amplification product is hybridized to an immobilized probe attached to the solid support.

Embodiment 79: The method of embodiment 78, wherein the immobilized probe is contained within a nucleic acid array.

Embodiment 80: A fluidic system configured for selectively isolating a microbial cell analyte from a sample according to the method of any one of embodiments 1 to 71, the system comprising: an input port configured to receive the sample; a first reservoir configured to contain the first lysis solution; a lysing chamber configured for mixing the sample with the first lysis solution to obtain the first lysate; a filter chamber containing the filter; a second reservoir configured to contain the second lysis solution; a third reservoir configured to contain an elution reagent that is effective to elute the released analyte from the filter; an elution chamber configured for receiving the eluate; and a fluid channel arrangement configured to provide (a) fluid communication between the lysing chamber and each of the input port and the first reservoir and (b) fluid communication between the filter chamber and each of the lysing chamber, the second and third reservoirs, and the elution chamber.

Embodiment 81: The fluidic system of embodiment 80, wherein the fluid channel arrangement can be configured to direct fluid flow in a first direction through the filter chamber from the lysing chamber, through the filter chamber, and to the elution chamber and can be selectively configured to direct fluid flow in the first direction through the filter chamber from the third reservoir, through the filter chamber, and to the elution chamber or in a second direction through the filter chamber, opposite the first direction, from the third reservoir, through the filter chamber, and to the elution chamber.

Embodiment 82: The fluidic system of embodiment 80, further comprising at least one of a heater thermally coupled to the filter chamber, a sonotrode coupled to the filter chamber, or a conductive mesh placed in the filter chamber for applying electrolysis.

Embodiment 83: The fluidic system of any one of embodiments 80 to 82, further comprising one or both of a fourth reservoir for a neutralizing buffer, wherein the fluid channel arrangement further provides fluid communication between the elution chamber and the fourth reservoir, and a fifth reservoir for a wash buffer, wherein the fluid channel arrangement further provides fluid communication between the filter chamber and the fifth reservoir.

Embodiment 84: The fluidic system of any one of embodiments 80 to 83, further comprising one or both of the first lysis solution and the second lysis solution.

Embodiment 85: The fluidic system of embodiment 84, wherein the fluidic system comprises the first lysis solution and the first lysis solution comprises guanidine hydrochloride at a concentration of from about 1 M to about 8 M, polysorbate 20 at a concentration of from about 0.5% (v/v) to about 5% (v/v), saponin at a concentration of from about 0.5% (w/v) to about 5% (w/v), and Tris at a concentration of from about 10 mM to about 100 mM.

Embodiment 86: The fluidic system of embodiment 84 or 85, wherein the fluidic system comprises the second lysis solution and the second lysis solution comprises sodium hydroxide at a concentration of from about 20 mM to about 500 mM, dimethyl sulfoxide (DMSO) at a concentration of from about 5% (v/v) to about 30% (v/v), glycerol at a concentration of from about 1% (v/v) to about 15% (v/v), and a buffer.

Embodiment 87: The fluidic system of embodiment 86, wherein the buffer in the second lysis solution is Tris and is present at a concentration of from about 1 mM to about 50 mM.

Embodiment 88: The fluidic system of embodiment 86 or 87, wherein the second lysis solution further comprises 2,2',2",2'''-(Ethane-1,2-diyldinitrilo)tetraacetic acid (EDTA) at a concentration of from about 0.1 mM to about 4 mM.

Embodiment 89: The fluidic system of any one of embodiments 80 to 88, further comprising an amplification chamber for containing a nucleic acid amplification reaction, wherein the amplification chamber is directly or indirectly connected or connectable by the fluid channel arrangement to the elution chamber.

Embodiment 90: The fluidic system of embodiment 89, further comprising an analysis chamber within which a detection process is performed to detect the analyte, wherein the amplification chamber is directly or indirectly connected or connectable by the fluid channel arrangement to the amplification chamber.

Embodiment 91: The fluidic system of embodiment 90, wherein the analysis chamber comprises a biosensor for detecting the presence of specific target molecules in the sample.

Embodiment 92: A method for isolating an analyte from a sample, the method comprising: (a) providing a sample potentially containing intact cells; (b) filtering the sample through a filter having a pore size that retains the intact cells; (c) contacting the filter containing the retained cells with a lysis solution that is effective to lyse the cells and release therefrom an analyte; (d) providing conditions for lysing the retained cells in the lysis solution whereby at least a portion of the cells are lysed and the analyte released therefrom; and (e) passing an immiscible liquid through the filter to push an eluate containing the analyte out of the filter.

Embodiment 93: The method of embodiment 92, further comprising separating the eluate from the immiscible liquid.

Embodiment 94: The method of embodiment 92 or 93, wherein the immiscible liquid is selected from the group consisting of oils and hydrocarbons.

Embodiment 95: The method of any one of embodiments 92 to 94, wherein the cells are microbial cells.

Embodiment 96: The method of embodiment 95, wherein the microbial cells are bacterial cells.

Embodiment 97: The method of embodiment 95, wherein the microbial cells are yeast cells.

Embodiment 98: The method of any one of embodiments 95 to 97, further comprising a selective lysis step before step (b), wherein the selective lysis step comprises selectively lysing any mammalian cells in the sample while leaving the microbial cells intact.

Embodiment 99: The method of embodiment 98, wherein the mammalian cells are human cells.

Embodiment 100: The method of embodiment 98 or 99, wherein the mammalian cells are blood cells.

Embodiment 101: The method of any one of embodiments 95 to 100, wherein the lysis solution at step (c) comprises sodium hydroxide, dimethyl sulfoxide (DMSO), glycerol, and a buffer.

Embodiment 102: The method of embodiment 101, wherein sodium hydroxide is present in the lysis reaction at a concentration of from about 20 mM to about 500 mM.

Embodiment 103: The method of embodiment 102, wherein sodium hydroxide is present in the lysis solution at a concentration of from about 50 mM to about 100 mM.

Embodiment 104: The method of embodiment 102, wherein sodium hydroxide is present in the lysis reaction at a concentration of about 85 mM.

Embodiment 105: The method of any one of embodiments 101 to 104, wherein DMSO is present in the lysis solution at a concentration of from about 5% (v/v) to about 30% (v/v).

Embodiment 106: The method of embodiment 105, wherein DMSO is present in the lysis solution at a concentration of from about 10% (v/v) to about 25% (v/v).

Embodiment 107: The method of embodiment 105, wherein DMSO is present in the lysis solution at a concentration of about 18% (v/v).

Embodiment 108: The method of any one of embodiments 101 to 107, wherein glycerol is present in the lysis solution at a concentration of from about 1% (v/v) to about 15% (v/v).

Embodiment 109: The method of embodiment 108, wherein glycerol is present in the lysis solution at a concentration of from about 3% (v/v) to about 10% (v/v).

Embodiment 110: The method of any one of embodiments 101 to 108, wherein glycerol is present in the lysis solution at a concentration of about 7% (v/v).

Embodiment 111: The method of any one of embodiments 101 to 110, wherein the buffer in the lysis solution is Tris and is present at a concentration of from about 1 mM to about 50 mM.

Embodiment 112: The method of embodiment 111, wherein Tris is present in the lysis solution at a concentration of from about 5 mM to about 10 mM.

Embodiment 113: The method of any one of embodiments 101 to 111, wherein the lysis solution further comprises a chelating agent.

Embodiment 114: The method of embodiment 113, wherein the chelating agent in the lysis solution is 2,2',2",2'''-(Ethane-1,2-diyldinitrilo)tetraacetic acid (EDTA) and is present at a concentration of from about 0.1 mM to about 4 mM.

Embodiment 115: The method of embodiment 114, wherein EDTA is present in the lysis solution at a concentration of from about 0.5 mM to about 2 mM.

Embodiment 116: The method of embodiment 114, wherein EDTA is present in the lysis solution at a concentration of about 1 mM.

Embodiment 117: The method of any one of embodiments 95 to 116, wherein the conditions for lysing of step (d)

comprise incubating the filter with the lysis solution at an incubation temperature of from about 80° C. to about 150° C.

Embodiment 118: The method of embodiment 117, wherein the incubation temperature is from about 90° C. to about 130° C.

Embodiment 119: The method of any one of embodiments 95 to 118, wherein the conditions for lysing of step (d) comprise sonication and/or ultrasound and/or electrolysis.

Embodiment 120: The method of any one of embodiments 92 to 119, wherein the filter has a pore size of about 1 µm or less.

Embodiment 121: The method of embodiment 120, wherein the filter has a pore size of from about 0.1 µm to about 1 µm.

Embodiment 122: The method of embodiment 120, wherein the filter has a pore size of from about 0.2 µm to about 1 µm.

Embodiment 123: The method of embodiment 122, wherein the filter has a pore size of about 0.22 µm.

Embodiment 124: The method of any one of embodiments 92 to 123, wherein the filter comprises polyethersulfone (PES), cellulose, nylon, polyvinylidene fluoride (PVDF), polycarbonate, or glass fiber.

Embodiment 125: The method of any one of embodiments 92 to 124, wherein the direction of fluid flow through the filter in step (e) is the same as the direction of fluid flow applied in the filtering step (b).

Embodiment 126: The method of any one of embodiments 92 to 124, wherein the direction of fluid flow through the filter in step (e) is opposite the direction of fluid flow applied in the filtering step (b).

Embodiment 127: The method of any one of embodiments 92 to 126, further comprising (f) adding a neutralizing buffer to the eluate obtained in step (f).

Embodiment 128: The method of embodiment 127, wherein the neutralizing buffer comprises hydrochloric acid (HCl) and Tris.

Embodiment 129: The method of any one of embodiments 92 to 128, further comprising a washing step between steps (b) and (c), wherein the washing step comprises flowing a wash buffer through the filter.

Embodiment 130: The method of embodiment 129, wherein the wash buffer comprises polysorbate 20, EDTA, and Tris.

Embodiment 131: The method of embodiment 129, wherein the wash buffer is the same as the lysis solution or is a diluted concentration of the lysis solution.

Embodiment 132: The method of any one of embodiments 92 to 128, wherein the method does not comprise a washing step between steps (b) and (c).

Embodiment 133: The method of any one of embodiments 92 to 132, wherein the analyte is a nucleic acid.

Embodiment 134: The method of any one of embodiments 92 to 133, further comprising analyzing the isolated analyte.

Embodiment 135: The method of embodiment 92 to 133, further comprising analyzing the isolated nucleic acid.

Embodiment 136: The method of embodiment 135, wherein analyzing the isolated nucleic acid comprises (i) performing an amplification reaction using the isolated nucleic acid as a template to generate an amplification product; and (ii) detecting the amplification product.

Embodiment 137: The method of embodiment 136, wherein the amplification reaction is PCR.

Embodiment 138: The method of embodiment 136, wherein the amplification reaction is an isothermal amplification reaction.

Embodiment 139: The method of embodiment 138, wherein the isothermal amplification reaction is a transcription-mediated amplification reaction.

Embodiment 140: The method of any one of embodiments 136 to 139, wherein the detecting step (ii) is performed in real time.

Embodiment 141: The method of any one of embodiments 136 to 139, wherein analyzing the isolated nucleic acid comprises immobilizing the isolated nucleic acid or amplification product on a solid support.

Embodiment 142: The method of embodiment 141, wherein the isolated nucleic acid or amplification product is hybridized to an immobilized probe attached to the solid support.

Embodiment 143: The method of embodiment 142, wherein the immobilized probe is contained within a nucleic acid array.

Embodiment 144: The method of any one of embodiments 1 to 79, further comprising an enzymatic treatment step between steps (c) and (d), wherein the enzymatic treatment step comprises contacting the filter containing the retained microbial cells with an enzyme that is effective to degrade one or more microbial cell wall components.

Embodiment 145: The method of embodiment 144, wherein the enzyme is mutanolysin, lyticase, and/or lysozyme.

Embodiment 146: The method of any one of embodiments 92 to 143, further comprising an enzymatic treatment step between steps (b) and (c), wherein the enzymatic treatment step comprises contacting the filter containing the retained microbial cells with an enzyme that is effective to degrade one or more microbial cell wall components.

Embodiment 147: The method of embodiment 146, wherein the enzyme is mutanolysin, lyticase, and/or lysozyme.

Embodiment 148: The method of any one of embodiments 1 to 79, further comprising an enzymatic treatment step between steps (c) and (d), wherein the enzymatic treatment step comprises contacting the filter containing the retained microbial cells with an enzyme solution that is effective to degrade one or more microbial cell wall components.

Embodiment 149: The method of embodiment 148, wherein the enzyme is mutanolysin, lyticase, and/or lysozyme.

Embodiment 150: The method of any one of embodiments 92 to 143, further comprising an enzymatic treatment step between steps (b) and (c), wherein the enzymatic treatment step comprises contacting the filter containing the retained microbial cells with an enzyme solution that is effective to degrade one or more microbial cell wall components.

Embodiment 151: The method of embodiment 150, wherein the enzyme is mutanolysin, lyticase, and/or lysozyme.

Embodiment 152: The method of any one of embodiments 1 to 79, further comprising an enzymatic treatment step between steps (c) and (d), wherein the enzymatic treatment step comprises contacting the filter containing the retained microbial cells with an enzyme solution containing at least two enzymes that are each effective to degrade one or more microbial cell wall components.

Embodiment 153: The method of embodiment 152, wherein the at least two enzymes contained in the enzyme solution are mutanolysin at a concentration from about 0 U/mL to about 1,000 U/mL, and lyticase at a concentration from about 0 U/mL to about 1,000 U/mL, and lysozyme at a concentration from about 0 U/mL to about 1,000 U/mL.

Embodiment 154: The method of any one of embodiments 92 to 143, further comprising an enzymatic treatment step between steps (b) and (c), wherein the enzymatic treatment step comprises contacting the filter containing the retained microbial cells with an enzyme solution containing at least two enzymes that are each effective to degrade one or more microbial cell wall components.

Embodiment 155: The method of embodiment 154, wherein the at least two enzymes contained in the enzyme solution are mutanolysin at a concentration from about 0 U/mL to about 1,000 U/mL, and lyticase at a concentration from about 0 U/mL to about 1,000 U/mL, and lysozyme at a concentration from about 0 U/mL to about 1,000 U/mL.

Embodiment 156: A fluidic system configured for selectively isolating a microbial cell analyte from a sample, the system comprising: an input port configured to receive a sample containing mammalian cells and potentially containing microbial cells; a first reservoir configured to contain a first lysis solution; a lysing chamber configured for mixing the sample with the first lysis solution to obtain the first lysate containing lysed mammalian cells and intact microbial cells, if present, wherein the lysing chamber is in fluid communication with the input port and the first reservoir; a filter chamber containing a filter having a pore size from about 0.1 µm to about 1 µm, and/or containing an asymmetric filter comprising pores on a first side having a size from about 5 µm to about 20 µm and pores on a second side having a size of up to about 0.2 µm, wherein the filter chamber is in fluid communication with the lysing chamber and with a waste chamber configured for receiving lysate; a second reservoir configured to contain a second lysis solution, wherein the second reservoir is in fluid communication with filter chamber; a third reservoir configured to contain an elution reagent, wherein the third reservoir is in fluid communication with the filter chamber; an elution chamber configured for receiving an eluate, wherein the elution chamber is in fluid communication with the filter chamber; and a fluid channel arrangement configured to provide (a) fluid communication between the lysing chamber and each of the inlet port and the first reservoir and (b) fluid communication between the filter chamber and each of the lysing chamber, the second and third reservoirs, and the elution chamber.

Embodiment 157: A lysis solution comprising sodium hydroxide at a concentration of from about 20 mM to about 500 mM, dimethyl sulfoxide (DMSO) at a concentration of from about 5% (v/v) to about 30% (v/v), glycerol at a concentration of from about 1% (v/v) to about 5% (v/v), a chelating agent, and a buffer.

Embodiment 158: The lysis buffer of embodiment 157, wherein sodium hydroxide is present in the second lysis solution at a concentration of about 20 mM or about 85 mM.

Embodiment 159: The lysis solution of embodiment 157 or 158, wherein DMSO is present in the second lysis solution at a concentration of about 18% (v/v).

Embodiment 160: The lysis solution of any one of embodiments 157 to 159, wherein glycerol is present in the second lysis solution at a concentration of about 7% (v/v).

Embodiment 161: The lysis solution of any one of embodiments 157 to 160, wherein EDTA is present in the second lysis solution at a concentration of about 1 mM.

Embodiment 162: The lysis solution of any one of embodiments 157 to 161, wherein Tris is present in the second lysis solution at a concentration of from about 5 mM to about 10 mM.

Definitions

Unless defined otherwise, all technical and scientific terms used herein have the same meaning as commonly understood by one of ordinary skill in the art pertinent to the methods and compositions described. As used herein, the following terms and phrases have the meanings ascribed to them unless specified otherwise.

The terms "a," "an," and "the" include plural referents, unless the context clearly indicates otherwise.

The terms "microbe," "microorganism," and "microbial," as used herein, refer to bacteria, archaea, fungi, and protists. In some embodiments, a microbe is a prokaryote (i.e., a species of bacteria or archaea). In other embodiments, a microbe is a microbial species having a cell wall such as any species of bacteria, archaea, or fungi, or some protist species.

The term "intact," as used herein in reference to a cell (e.g., a microbial cell), means a cell with a substantially non-disrupted cell membrane and/or cell wall, such that intracellular constituents are generally retained within the cell.

An "analyte," as used herein, refers to a substance or one or more constituents thereof that is for identification and/or characterization, such as, e.g., detection via a probe or sequencing. Examples of analytes include, without limitation, DNA, RNA, and protein. In the context of the present disclosure, analytes are constituents of cells (e.g., microbial cells).

"Sample" includes any specimen that may contain an analyte. Samples include "biological samples," which include any tissue or material derived from a living or dead mammal (e.g., human). Also, samples may include processed samples, such as, e.g., those obtained from passing samples over or through a filtering device, or following centrifugation, or by adherence to a medium, matrix, or support.

A "detergent" refers to a substance that can disperse a hydrophobic substance (e.g., lipids) in water by emulsification and which can be used to lyse or solubilize a biological sample for subsequent analysis. Detergents may be ionic or nonionic.

A buffer refers to a weak acid or weak base used to maintain the pH of a solution.

The term "immiscible liquid," as used herein, means any liquid that is immiscible with water, such that the immiscible liquid and an aqueous phase solution do not mix to attain homogeneity. Immiscible liquids typically have a high content of carbon and may include, for example, silicone oil, mineral oil, fluorocarbon oil, vegetable oil, or a combination thereof, among others.

The term "asymmetric structure," as used herein in reference to a filter, refers to a filter with pores having variable pore diameters and wherein pores on one side of the filter are generally larger than pores on an opposite side of the filter.

A "nucleic acid" refers to a multimeric compound comprising nucleotides or analogs that have nitrogenous heterocyclic bases or base analogs linked together to form a polymer, including conventional RNA, DNA, mixed RNA-DNA, and analogs thereof.

The term "microfluidic device" or "microfluidic cartridge" refers to a device within which fluid may flow and in which at least a portion of any fluid passages, chambers, etc. within which fluid flows or is retained is geometrically constrained to a small scale (for example, sub-millimeter) at which surface forces acting on the fluids meet or exceed volumetric forces.

The term "biosensor," as used herein, means a device that measures biological or chemical reactions by generating signals proportional to the concentration of an analyte in the reaction.

The term "nucleic acid array," as used herein, refers to a solid support upon which a collection of target-specific nucleic acids has been placed at defined locations, either by spotting or direct synthesis.

A "nucleotide" as used herein is a subunit of a nucleic acid consisting of a phosphate group, a 5-carbon sugar, and a nitrogenous base (also referred to herein as "nucleobase"). The 5-carbon sugar found in RNA is ribose. In DNA, the 5-carbon sugar is 2'-deoxyribose.

"Oligomer," "oligonucleotide," or "oligo" refers to a nucleic acid of generally less than 1,000 nucleotides (nt), including those in a size range having a lower limit of about 5 nt and an upper limit of about 900 nt. The term oligonucleotide does not denote any particular function to the reagent; rather, it is used generically to cover all such reagents described herein. Oligomers may be referred to by a functional name (e.g., capture probe, detection probe, primer, or promoter primer) but those skilled in the art will understand that such terms refer to oligomers.

"Pore size" or any reference to the size of a pore refers to a measure of each pore characterizing the size of the largest particle that will pass through the pore. For example, in the context of a pore having a circular or generally circular transverse shape, the pore size may refer to the diameter of the shape. In the context of pores having a more rectangular or oval shape, the pore size may refer to the smaller width dimension of the shape, which corresponds to the width of the largest particle that may pass through the pore.

The term "target sequence" or "target nucleic acid sequence" as used herein refers to the particular nucleotide sequence of a nucleic acid analyte that is to be amplified and/or detected. The "target sequence" includes the complexing sequences to which oligonucleotides (e.g., priming oligonucleotides and/or promoter oligonucleotides) complex during an amplification processes (e.g., PCR, TMA). Unless the context clearly dictates otherwise, where the nucleic acid analyte is originally single-stranded, the term "target sequence" will also refer to the sequence complementary to the "target sequence" as present in the nucleic acid analyte, and where the nucleic acid analyte is originally double-stranded, the term "target sequence" refers to both the sense (+) and antisense (−) strands.

"Nucleic acid amplification" refers to any well-known in vitro procedure that produces multiple copies of a target nucleic acid sequence. Examples of such procedures include transcription-associated methods, e.g., transcription-mediated amplification (TMA), nucleic acid sequence-based amplification (NASBA) and others (e.g., U.S. Pat. Nos. 5,399,491, 5,554,516, 5,437,990, 5,130,238, 4,868,105, and 5,124,246), replicase-mediated amplification (e.g., U.S. Pat. No. 4,786,600), polymerase chain reaction (PCR) (e.g., U.S. Pat. Nos. 4,683,195, 4,683,202, and 4,800,159), ligase chain reaction (LCR) (e.g., EP Patent No. 0320308), and strand-displacement amplification (SDA) (e.g., U.S. Pat. No. 5,422,252).

By "amplicon" or "amplification product" is meant a nucleic acid molecule generated in a nucleic acid amplification reaction and which is derived from a nucleic acid analyte. An amplicon or amplification product contains a target nucleic acid sequence that may be of the same or opposite sense as the nucleic acid analyte.

An "amplification oligonucleotide" or "amplification oligomer" is an oligonucleotide that hybridizes to a nucleic acid analyte and participates in a nucleic acid amplification reaction, e.g., serving as a primer. Amplification oligomers can have 3' ends that are extended by polymerization as part of the nucleic acid amplification reaction. Amplification oligomers can alternatively have 3' ends that are not extended by polymerization, but provide a component that facilitates nucleic acid amplification, e.g., a promoter sequence joined 5' to the target-specific sequence of the amplification oligomer. Such an amplification oligomer is referred to as a promoter provider. Amplification oligomers that provide both a 3' target-specific sequence that is extendable by polymerization and a 5' promoter sequence are referred to as promoter primers. Amplification oligomers may be optionally modified to include 5' non-target-specific sequences such as tags, promoters (as mentioned), or other sequences used or useful for manipulating or amplifying the primer or target oligonucleotide.

"Detection probe oligomer," "detection probe," or "probe" refers to an oligomer that hybridizes specifically to a target sequence, including an amplified product, under conditions that promote nucleic acid hybridization, for detection of a nucleic acid analyte. Detection may either be direct (i.e., probe hybridized directly to the target) or indirect (i.e., a probe hybridized to an intermediate structure that links the probe to the target). A probe's target-specific sequence generally refers to the specific sequence within a larger sequence which the probe hybridizes specifically. A detection probe may include target-specific sequence(s) and non-target-specific sequence(s). Such non-target-specific sequences can include sequences which will confer a desired secondary or tertiary structure, such as a hairpin structure, which can be used to facilitate detection and/or amplification.

"Label" or "detectable label" refers to a moiety or compound joined directly or indirectly to a probe that is detected or leads to a detectable signal. Direct joining may use covalent bonds or non-covalent interactions (e.g., hydrogen bonding, hydrophobic or ionic interactions, and chelate or coordination complex formation) whereas indirect joining may use a bridging moiety or linker (e.g., via an antibody or additional oligonucleotide(s), which amplify a detectable signal). Any detectable moiety may be used, e.g., radionuclide, ligand such as biotin or avidin, enzyme, enzyme substrate, reactive group, chromophore such as a dye or particle (e.g., latex or metal bead) that imparts a detectable color, luminescent compound (e.g., bioluminescent, phosphorescent, or chemiluminescent compound such as an acridinium ester ("AE") compound), and fluorescent compound (i.e., fluorophore). Fluorophores may be used in combination with a quencher molecule that absorbs light when in close proximity to the fluorophore to diminish background fluorescence. Detectably labeled probes include, for example, hydrolysis (e.g., TaqMan™) probes, AE-labeled probes, molecular torches, and molecular beacons.

Reference to a numerical range herein (e.g., "X to Y" or "from X to Y") includes the endpoints defining the range and all values falling within the range.

To the extent used herein, the terms "first" and "second" preceding the name of an element (e.g., a component, apparatus, location, feature, or a portion thereof or a direction of movement, force, or other dynamic action) are used for identification purposes to distinguish between similar elements, and are not intended to necessarily imply order, nor are the terms "first" and "second" intended to preclude the inclusion of additional similar elements. Furthermore, use of the term "first" preceding the name of an element (e.g., a component, apparatus, location, feature, or a portion thereof or a direction of movement, force, or other dynamic action) does not necessarily imply or require that there be additional, e.g., "second," "third," etc., such element(s).

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left, right, in front of, behind, beneath, next to, adjacent, between, horizontal, vertical, diagonal, longitudinal, transverse, radial, axial, clockwise, counter-clockwise, etc., are used for convenience in referring to such component, apparatus, location, feature, or a portion thereof or movement, force, or other dynamic action represented in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

The term "fluid communication" means either direct fluid communication, for example, two regions can be in fluid communication with each other via an unobstructed fluid passageway connecting the two regions, or can be capable of being in fluid communication, for example, two regions can be capable of fluid communication with each other when they are connected via a fluid passageway that can comprise a valve disposed therein, wherein fluid communication can be established between the two regions upon opening the valve, for example, by dissolving a dissolvable valve, bursting a rupturable seal, or actuating a mechanical valve disposed in the fluid passageway.

To the extent used herein, the terms "about" or "approximately" apply to all numeric values and terms indicating specific physical orientations or relationships such as horizontal, vertical, parallel, perpendicular, concentric, or similar terms, specified herein, whether or not explicitly indicated. This term generally refers to a range of numbers, orientations, and relationships that one of ordinary skill in the art would consider as a reasonable amount of deviation to the recited numeric values, orientations, and relationships (i.e., having the equivalent function or result) in the context of the present disclosure. For example, and not intended to be limiting, this term can be construed as including a deviation of ±10 percent of the given numeric value, orientation, or relationship, provided such a deviation does not alter the end function or result of the stated value, orientation, or relationship. Therefore, under some circumstances, as would be appreciated by one of ordinary skill in the art, a value of about or approximately 1% can be construed to be a range from 0.9% to 1.1%.

DETAILED DESCRIPTION

The present disclosure provides methods and systems for isolating an analyte from a sample, including methods and systems for selectively isolating a microbial cell analyte from a sample containing mammalian cells. The disclosed methods and systems are particularly useful, e.g., for increasing sensitivity of downstream molecular diagnostic assays targeting the isolated analyte. For example, detection sensitivity in analytics applications such as, e.g., nucleic acid amplification and detection, is generally dependent on the amount of analyte introduced to a detection reaction. While typical molecular diagnostics applications are considered of high sensitivity, typical analyte extraction procedures for such applications (for example, DNA or RNA extraction for downstream use in amplification) do not provide the needed sensitivity. In certain aspects, the present disclosure addresses this problem by providing a method for enriching a microbial cell analyte, which may be present in relatively low amounts in a larger volume of a sample containing mammalian cells, using selective lysis to lyse mammalian cells and filtering the lysate to capture and isolate microbial cells, while mammalian DNA released by the selective lysis step will pass through the filter. In this manner, overall assay sensitivity can be improved. In other aspects, the present disclosure provides a method for isolating an analyte from a sample using on-filter lysis of intact cells followed by elution using an immiscible liquid to push an eluate containing released analyte out of the filter. The methods and corresponding systems are applicable, for example, to molecular diagnostics for nucleic acid detection (e.g., by quantitative PCR, nucleic acid array, and/or other microarray, and other nucleic acid detection modalities such as, for example, next generation sequencing) as well as detection of other biomolecules such as protein (e.g., by ELISA, protein arrays, MALDI-TOF, nanoLC/UPLC-ESI-MS, and other relevant detection modalities).

One concept of the disclosure is to use size selection filtering for enrichment of microbial organisms from a vast background matrix volume (such as, blood or other biological matrix), thus leading both to enrichment of the analyte concentration in the sample as well as replacing the sample matrix with one more compatible downstream analytics procedures (e.g., PCR or other detection methods, including immunological detection). Accordingly, a large sample volume (e.g., up to about 5 mL) can be processed for detecting analytes that may be present in very low concentrations. For example, there can be very low initial concentrations of microbes in blood of a blood stream infection (BSI) patient (e.g., 1 or 2 microbes/mL). In such cases, it can be advantageous to filter a larger sample volume, such that an enriched eluate contains enough targets to be detected. At the same time, maximizing volume can be difficult due to the potential for clogging a filter: for example, blood samples can vary significantly in patients having infection, with different levels of leukocytes, proteins, infection markers, hematocrit, coagulation factors, and the like. In certain aspects of the disclosure, this problem is addressed by formulation of a lysis solution for selective lysis (a "first lysis solution" as disclosed herein; e.g., a lysis solution comprising guanidine hydrochloride, saponin, and polysorbate 20 as described herein) and/or use of a filter comprising an advantageous membrane type (e.g., polyethersulfone (PES)).

The size selection is achieved by using specific filters with selected pore sizes and filter material, optionally with asymmetric structure such that pore size decreases moving downstream through the filter membrane. In some examples, prokaryotic and eukaryotic target organism (bacteria and yeast) are trapped with filters having, e.g., 0.22 μm pore sizes and composed of, e.g., polyethersulfone (PES) or some other applicable membrane material. Selected membrane size and material allows efficient capture of the organisms containing the target analytes, and, moreover, the membrane type is not easily clogged even by using larger sample volume or by excessive washing of the membrane for particles smaller than the pore size. To bring the analytes to the downstream analytics processes (such as, PCR, isothermal RNA/DNA amplification, protein, or other biomolecule analyte detection), on-filter lysis is used. Microbial/pathogenic organisms captured by the filter are lysed/disintegrated by chemical and/or physical methods, which releases analyte molecules from the intact organisms, allowing the analytes to be released from the capturing filter. Another possibility is to employ reverse elution flow on the filter by flowing the sample solution in one direction through the filter membrane and flowing the elution reagent in the opposite direction through the filter membrane. Intact organisms containing the analytes do not need to be lysed, because, by reversing the flow, the organisms are released from the capturing filter surface/matrix. Another option is to use a combination of the two aforementioned options.

As an example, lysis/disintegration methods described herein can be composed of, e.g., (a) chemical lysis using detergents and/or chaotropic salts and/or extreme pH values, glycerol/other alcohols, (b) enzymatic lysis on the filter, (c) physical lysis using an externally-controlled heat source embedded in the filter or induction mediated heating, where electrically-conductive or semi-conductive material like brass, copper, steel, iron, aluminum, graphite, carbon or silicon is embedded on/in the filter matrix by, e.g., lamination of a porous mesh or co-molding with the actual filter material, (d) physical lysis with direct electricity (electrolysis) where, e.g., conductive mesh structures are placed by lamination or similar process on both sides of the filter or sonication/ultrasound with a sonotrode in contact with the filter, or any combination of chemical/enzymatic/physical lysis/disintegration.

Fluidic Systems

As shown in FIG. 1, the present disclosure provides a fluidic system 100 for isolating an analyte from a sample using a method as described herein and for analyzing (e.g., detecting) an isolated analyte. System 100 may comprise a fluidic cartridge (e.g., a microfluidic cartridge) configured to be operably coupled to a processing device, or docking station, (not shown) and including a substrate which may include a first substrate portion 102a that contains components of a first fluidic system 100a for isolating an analyte from a sample, such as chambers interconnected by microchannels which may include valves for controlling fluid flow through the microchannels, and a second substrate portion 102b that contains components of a second fluidic system 100b for analyzing an isolated analyte, such as additional chambers interconnected by microchannels which may include valves for controlling fluid flow through the microchannels. A dashed line 102 separates first substrate portion 102a and first fluidic system 100a from second substrate portion 102b and second fluidic system 100b. Dashed line 102 signifies that first substrate portion 102a and second substrate portion 102b could comprise a single, contiguous substrate, or first substrate portion 102a and second substrate portion 102b could be separate, discrete substrates (e.g., separate cartridges) that can be fluidically coupled to one another.

First substrate portion 102a and second substrate portion 102b may be made from suitable materials that can be molded and/or machined to form features of the first and second fluidic systems 100a, 100b and which does not adversely react with sample or reaction process materials. Suitable materials include thermoplastic polymer material, such as cyclic olefin copolymers (COC) or cyclic olefin polymers (COP), or any thermoplastic polymer suitable for injection molding. In one embodiment, first substrate portion 102a and second substrate portion 102b may be made of polypropylene (PP). Other exemplary materials may be chosen from the group including polycarbonate, polyacrylamide, polyethylene, polymethyl-methacrylate (PMMA), polydimetyl-siloxane (PDMS), and polyvinyl chloride (PVC).

Microchannels may be defined by grooves formed in an outer surface of the first substrate portion 102a or second substrate portion 102b and covered with a film secured to the outer surface of the substrate portion. Chambers may be defined by recessed cavities formed in the outer surface of the first substrate portion 102a or second substrate portion 102b and covered with a film secured to the outer surface of the substrate portion. Valves may comprise a blockage within a microchannel that is modifiable from a blocking state preventing fluid flow through the associated microchannel to an open state permitting fluid flow through the associated microchannel. The valve may comprise a dissolvable or rupturable blockage or a flexible seal that is manipulable, e.g., by an external actuator, between a blocking state and an open state. In one embodiment, the valve is modifiable between the blocking state and open state and vice versa so as to enable selective fluid flow control through the associated microchannel. Elements of an exemplary cartridge design and associated processing device that may be applicable to the methods and systems described herein are described in U.S. Pat. No. 10,654,039.

In some embodiments, the first fluidic system 100a provides a platform for selectively isolating a microbial cell analyte from a sample using a selective lysis and filtering method or using an immiscible liquid elution as described herein. First fluidic system 100a may generally include an input port or sample chamber or reservoir 104 (which may include an input port) configured to receive a sample; a first reservoir 106 which may contain a first process fluid, such as a first lysis solution; a lysing chamber 108 for mixing the sample with the first lysis solution to obtain the first lysate; a filter chamber 120 containing a filter, and which may also include a component 122 for effecting on-filter physical lysis; a second reservoir 110 which may contain a second process fluid, such as a second lysis solution; a third reservoir 116 which may contain a third process fluid, such as an elution reagent that is effective to elute a released analyte from the filter; an elution chamber 124 for receiving an eluate; and a fluid channel arrangement (described in more detail below) configured to provide (a) fluid communication between the lysing chamber 108 and each of the inlet port/sample chamber 104 and the first reservoir 106 and (b) fluid communication between the filter chamber 120 and each of the lysing chamber 108, the second reservoir 110 and third reservoir 116, and the elution chamber 124.

Component 122 of filter chamber 120 may comprise a heat source thermally coupled to the filter chamber (e.g., induction mediated heater embedded in the filter for heating the filter, with retained microbial cells, in the presence of the second lysis solution), a sonotrode coupled to the filter chamber (e.g., for applying sonication or ultrasound, with retained microbial cells, in the presence of the second lysis solution), or conductive mesh structures placed the filter chamber (e.g., for applying electrolysis, with retained microbial cells, in the presence of the second lysis solution).

The first fluidic system 100a may also include a fourth reservoir 114 which may contain a fourth process fluid, such as a neutralizing buffer, wherein the fluid channel arrangement further provides fluid communication between the elution chamber 124 and the fourth reservoir 114, and/or a fifth reservoir 112 which may contain a fifth process fluid, such as a wash buffer, wherein the fluid channel arrangement further provides fluid communication between the filter chamber 120 and the fifth reservoir 112.

In the schematic representation of FIG. 1, elution chamber 124 and fourth reservoir 114 are shown as disposed within second substrate portion 102b, but the elution chamber 124 and the fourth reservoir 114 could be disposed within the first substrate portion 102a, or the elution chamber 124 may be omitted, as will be described below.

Solutions and other fluid materials contained in reservoirs of the first fluidic system 100a may be initially stored as dried, reconstitutable materials, and such dried materials may be initially stored in a corresponding reservoir at which a reconstitution reagent is combined with the dried material to form a solution within the reservoir. Reconstitution agent(s) may be initially stored in a reservoir that is external to the first fluidic system 100a or in one or more additional reservoir(s) that are part of the first fluidic system 100a. The fluid channel arrangement of the first fluidic system 100a may also include microchannels and valves for transport of reconstitution reagent(s) to reservoir(s) containing dried materials.

The first fluidic system 100a may also include a waste chamber 118, wherein the fluid channel arrangement further provides fluid communication between the filter chamber 120 and the waste chamber 118.

The first fluidic system 100a includes a first fluid channel arrangement providing selective fluid connectivity between various reservoirs, chambers, and other components of the system 100. The first fluid channel arrangement may include a number of fluid channels, or conduits, through which fluid may flow in a first or second direction and valves for controlling fluid flow through a particular channel (e.g., controlling fluid flow by permitting or preventing fluid flow through the channel). For example, in system 100 shown in FIG. 1, sample reservoir 104 may be connected by a channel 10 to a valve 50 that is configured to be manipulated (e.g., by an actuator of a processing device to which the first fluidic system 100a is coupled) to selectively (a) prevent fluid flow from the sample reservoir 104, (b) direct fluid flow from the sample reservoir 104 to the lysing chamber 108 via channel 10a, or (c) direct fluid flow from the sample reservoir 104 to the filter chamber 120 via channel 10b.

First reservoir 106 may be connected by a channel 12 to lysing chamber 108 through a valve 52 that is configured to be manipulated (e.g., by an actuator of a processing device to which the first fluidic system 100a is coupled) to selectively prevent fluid flow from the first reservoir 106 or direct fluid flow from the first reservoir 106 to the lysing chamber 108 via channel 12.

Lysing chamber 108 may be connected by a channel 14 to filter chamber 20 through a valve 54 that is configured to be manipulated (e.g., by an actuator of a processing device to which the first fluidic system 100a is coupled) to selectively prevent fluid flow from the lysing chamber 108 or direct fluid flow from the lysing chamber 108 to the filter chamber 120 via channel 14.

Second reservoir 110 may be connected by a channel 16 to filter chamber 120 through a valve 56 that is configured to be manipulated (e.g., by an actuator of a processing device to which the first fluidic system 100a is coupled) to selectively prevent fluid flow from the second reservoir 110 or direct fluid flow from the second reservoir 110 to the filter chamber 120 via channel 16.

Third reservoir 116 may be connected by a channel 20 to a valve 60 that is configured to be manipulated (e.g., by an actuator of a processing device to which the first fluidic system 100a is coupled) to selectively (a) prevent fluid flow from the third reservoir 116, (b) direct fluid flow from the third reservoir 116 to the filter chamber 120 in direction "A" (right to left in FIG. 1) via channel 20a, or (c) direct fluid flow from the third reservoir 116 to the filter chamber 120 in direction "B" (left to right in FIG. 1) via channel 20b.

Fifth reservoir 112 may be connected by a channel 18 to filter chamber 120 through a valve 58 that is configured to be manipulated (e.g., by an actuator of a processing device to which the first fluidic system 100a is coupled) to selectively prevent fluid flow from the fifth reservoir 112 or direct fluid flow from the fifth reservoir 112 to the filter chamber 120 via channel 18.

Filter chamber 120 may be connected by a channel 22 to waste chamber 118 through a valve 64 that is configured to be manipulated (e.g., by an actuator of a processing device to which the first fluidic system 100a is coupled) to selectively prevent fluid flow through channel 22 or direct fluid flow from the filter chamber 120 to the waste chamber 118 via channel 22.

Filter chamber 120 may be connected by channels 24a and 24b to a valve 62 that is configured to be manipulated (e.g., by an actuator of a processing device to which the first fluidic system 100a is coupled) to selectively (a) prevent fluid flow through channels 24a and 24b, (b) direct fluid flow from the filter chamber 120 to elution chamber 124 in direction "A" via channel 24a and channel 24, or (c) direct fluid flow from the filter chamber 120 to elution chamber 124 in direction "B" via channel 24b and channel 24.

Fourth reservoir 114 may be connected by a channel 26 to elution chamber 124 through a valve 66 that is configured to be manipulated (e.g., by an actuator of a processing device to which the first fluidic system 100a or second fluidic system 100b is coupled) to selectively prevent fluid flow from the fourth reservoir 114 or direct fluid flow from the fourth reservoir 114 to the elution chamber 124 via channel 26.

Fluid flow through the various channels may be effected by any known means, including one or more sources of negative and/or positive pressure (e.g., a syringe pump (not shown) that draws fluid from one reservoir, such as the sample reservoir 104, and then expels the fluid to another reservoir, such as the lysing chamber 108), or capillary action.

In some variations, the fluidic system 100 further includes one or both of a first lysis solution contained in the first reservoir 106 and a second lysis solution contained in the second reservoir 110 as described herein. For example, in certain embodiments, the system includes a first lysis solution comprising guanidine hydrochloride at a concentration of from about 1 M to about 8 M, polysorbate 20 at a concentration of from about 0.5% (v/v) to about 5% (v/v), saponin at a concentration of from about 0.5% (w/v) to about 5% (w/v), and a buffer such as, for example, Tris at a concentration of from about 10 mM to about 100 mM (e.g., a first lysis solution comprising guanidine hydrochloride at a concentration of about 4 M, polysorbate 20 at a concentration of about 4% (v/v), saponin at a concentration of about 4% (w/v), and Tris at a concentration of about 40.5 mM). In other, non-mutually exclusive embodiments, the system includes a second lysis solution comprising sodium hydroxide at a concentration of from about 20 mM to about 500 mM, dimethyl sulfoxide (DMSO) at a concentration of from about 5% (v/v) to about 30% (v/v), glycerol at a concentration of from about 1% (v/v) to about 15% (v/v), and a buffer such as, for example, Tris at a concentration of from about 1 mM to about 50 mM (e.g., a second lysis solution comprising sodium hydroxide at a concentration of about 85 mM, DMSO at a concentration of about 18% (v/v), glycerol at a concentration of about 7% (v/v), EDTA at a concentration of about 1 mM, and Tris at a concentration of about 7.5 mM). In some variations comprising a second lysis solution as above, the second lysis solution further comprises a chelating agent such as, for example, 2,2',2'',2'''-(Ethane-1, 2-diyldinitrilo)tetraacetic acid (EDTA) at a concentration of from about 0.1 mM to about 4 mM (e.g., about 1 mM). In some embodiments, a second lysis solution as above consists or consists essentially of sodium hydroxide, DMSO, glycerol, the chelating agent, the buffer, and water.

In other embodiments, the fluidic system is for isolating an analyte from a sample using an immiscible liquid elution method as described herein. In some such embodiments, the fluidic system is a system as described above for selective lysis and filtering, wherein the elution reagent is the immiscible liquid. In some variations, the system further includes the immiscible liquid.

In some embodiments, the second fluidic system 100b provides a platform for performing one or more processes associated with analyzing an analyte, including, for example, isolating a target analyte (target capture), amplification of the target analyte, and detection of the target analyte. Second fluidic system 100b may include a sample preparation chamber (such as a target isolation, or target capture, chamber) 126, an amplification chamber 128, a hybridization/detection (or analysis) chamber 130, a hybridization buffer reservoir 138, a hybridization wash buffer reservoir 140, a wash buffer reservoir 134, an elution buffer/ amplification reagent reservoir 136, and a waste chamber 132. In an alternate embodiment, first fluidic system 100a and second fluidic system 100b may share a common waste chamber.

Solutions and other fluid materials contained in reservoirs of the second fluidic system 100b may be initially stored as dried, reconstitutable materials, and such dried materials may be initially stored in a corresponding reservoir at which a reconstitution reagent is combined with the dried material to form a solution within the reservoir. Reconstitution agent(s) may be initially stored in a reservoir that is external to the second fluidic system 100b or in one or more additional reservoir(s) that are part of the second fluidic system 100b. The fluid channel arrangement of the second fluidic system 100b may also microchannels and valves for that transport reconstitution agent(s) to reservoir(s) containing dried materials.

The sample preparation chamber may comprise a target isolation chamber 126 (also referred to as "isolation chamber 126") for isolating, or capturing, one or more specific analytes. The target isolation chamber 126 may contain a silica-like membrane for DNA binding According to various embodiments, the target isolation chamber 126 may, for example, contain a gel, beads, or a paper filter for DNA binding and concentration. As a matter of illustration, agarose gel, silica beads and filter paper, such as cellulose, base purification may also be used.

Second fluidic system 100b includes a second fluid channel arrangement providing selective fluid connectivity between various reservoirs, chambers, and other components of the system 100. The second fluid channel arrangement may include a number of fluid channels, or conduits, through which fluid may flow in a first or second direction and valves for controlling fluid flow through a particular conduit. For example, in system 100 shown in FIG. 1, elution chamber 124 may be connected by a channel 28 to isolation chamber 126 through a valve 68 that is configured to be manipulated (e.g., by an actuator of a processing device to which the second fluidic system 100b is coupled) to selectively prevent fluid flow from the elution chamber 124 or direct fluid flow from the elution chamber 124 to the target isolation chamber 126 via channel 28. In an alternate arrangement, target isolation chamber 126 may be connected to filter chamber 120 of the first fluidic system 100a via channels 24, 24a, 24b controlled by valve 62, and elution chamber 124 and fourth reservoir 114 may be omitted. In another alternate embodiment, elution chamber 124 may be omitted, and fourth reservoir 114 may be connected directly to the target isolation chamber 126 without the intervening elution chamber.

Wash buffer reservoir 134 may be connected by a channel 36 to target isolation chamber 126 through a valve 76 that is configured to be manipulated (e.g., by an actuator of a processing device to which the second fluidic system 100b is coupled) to selectively prevent fluid flow from the wash buffer reservoir 134 or direct fluid flow from the wash buffer reservoir 134 to the target isolation chamber 126 via channel 36.

Elution buffer/amplification reagent reservoir 136 may be connected by a channel 38 to isolation chamber 126 through a valve 78 that is configured to be manipulated (e.g., by an actuator of a processing device to which the second fluidic system 100b is coupled) to selectively prevent fluid flow from the elution buffer/amplification reagent reservoir 136 or direct fluid flow from the elution buffer/amplification reagent reservoir 136 to the isolation chamber 126 via channel 38.

Target isolation chamber 126 may be connected by a channel 30 to waste chamber 132 through a valve 70 that is configured to be manipulated (e.g., by an actuator of a processing device to which the second fluidic system 100b is coupled) to selectively prevent fluid flow through channel 30 or direct fluid flow from the target isolation chamber 126 to the waste chamber 132 via channel 30.

Target isolation chamber 126 may be connected by a channel 32 to amplification chamber 128 through a valve 72 that is configured to be manipulated (e.g., by an actuator of a processing device to which the second fluidic system 100b is coupled) to selectively prevent fluid flow through channel 32 or direct fluid flow from the target isolation chamber 126 to the amplification chamber 128 via channel 32.

In embodiments in which a protocol for analyte detection does not include a process for isolating and purifying the microbial nucleic acid, target isolation chamber 126, wash buffer reservoir 134, elution buffer/amplification reagent reservoir 136, and waste chamber 132, as well as channels 30, 32, 36, and 38 and valves 70, 72, 76, and 78, may be omitted from the second fluidic system 100b. If the target isolation chamber 126 is omitted, the elution chamber 124 is connected to amplification chamber 128, or, in an alternate arrangement, amplification chamber 128 may be connected to filter chamber 120 of the first fluidic system 100a via channels 24, 24a, 24b controlled by valve 62, and elution chamber 124 and fourth reservoir 114 may be omitted.

Amplification chamber 128 may be connected by a channel 34 to hybridization/detection chamber 130 through a valve 74 that is configured to be manipulated (e.g., by an actuator of a processing device to which the second fluidic system 100b is coupled) to selectively prevent fluid flow through channel 34 or direct fluid flow from the amplification chamber 128 to the hybridization/detection chamber 130 via channel 34.

Hybridization wash buffer reservoir 140 may be connected by a channel 40 to hybridization/detection chamber 130 through a valve 80 that is configured to be manipulated (e.g., by an actuator of a processing device to which the second fluidic system 100b is coupled) to selectively prevent fluid flow from the hybridization wash buffer reservoir 140 or direct fluid flow from the hybridization wash buffer reservoir 140 to the hybridization/detection chamber 130 via channel 40.

Hybridization buffer reservoir 138 may be connected by a channel 42 to hybridization/detection chamber 130 through a valve 82 that is configured to be manipulated (e.g., by an actuator of a processing device to which the second fluidic system 100b is coupled) to selectively prevent fluid flow from the hybridization buffer reservoir 138 or direct fluid flow from the hybridization buffer reservoir 138 to the hybridization/detection chamber 130 via channel 42.

In an embodiment, hybridization chamber 130 comprises a biosensor for detecting the presence of specific target molecules in the sample. The biosensor interacts with the target molecule by ligation. The capture of the amplification products, or amplicons, among a multiplicity of candidates on a surface is a technique that is well known to those skilled in the art, to perform a multiplexed detection. One example of a biosensor is the micro-array (e.g., nucleic acid array). With such a micro-array, the identity and quantity of a target nucleic acid in a sample are detected by measuring the level of association of the target sequence with probes specifically provided for the sequence. In nucleic acid biochip technologies, a set of probe nucleic acids, each having a defined sequence, is immobilized on a solid support or substrate, e.g., a nucleic acid array, in such a way that each probe occupies a predetermined position. The processing device to which the second fluidic system 100b is coupled may include means for optical excitation of the array of the second fluidic system 100b and means for optical detection of an optical signal that is representative of the nucleic acid in the sample analyzed by the second fluidic system 100b.

In other embodiments, amplification and detection may occur in the same chamber.

Microbe Enrichment Using Selective Lysis and Filtering

Figure 2:
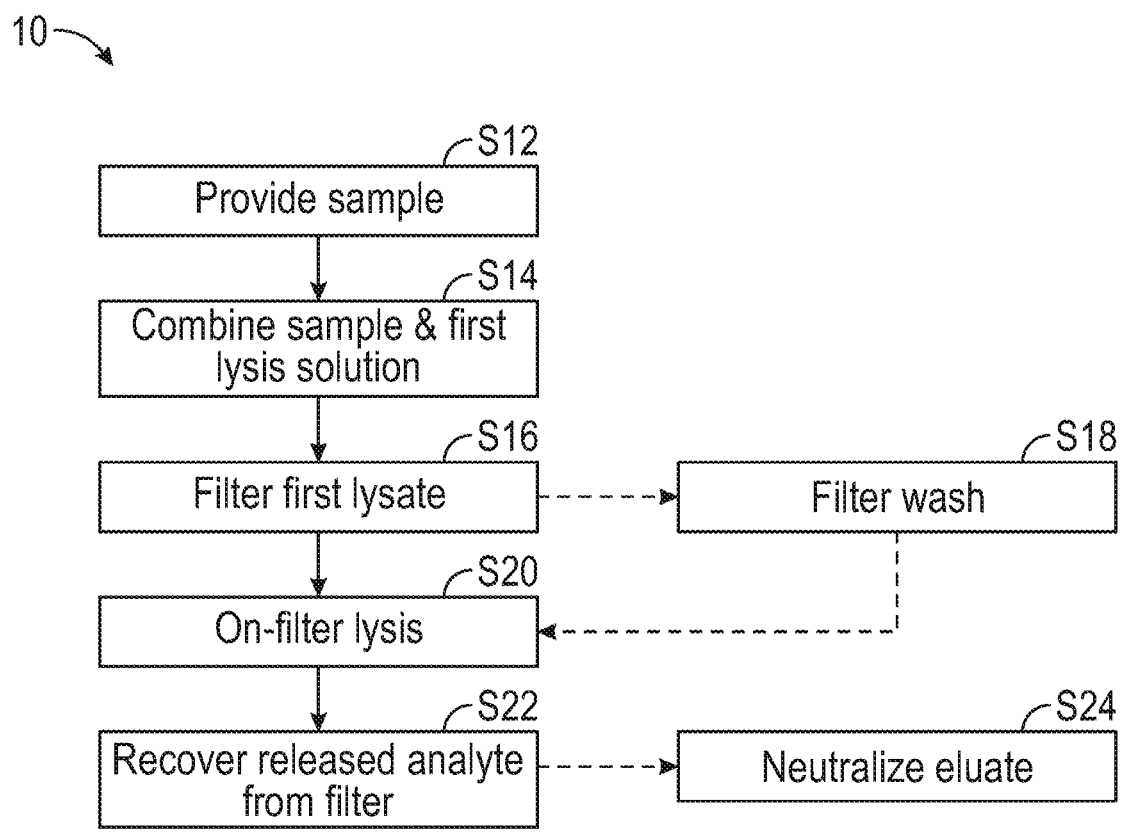
FIG. 2 is a flow chart showing a method for selectively isolating a microbial cell analyte in accordance with the present disclosure.

FIG. 2 is a flow chart showing a method 10 for selectively isolating a microbial cell analyte in accordance with the present disclosure. Method 10 generally includes the following steps: (a) providing a sample containing or potentially containing mammalian cells and microbial cells; (b) mixing the sample with a first lysis solution that selectively lyses the mammalian cells, if present, to obtain a first lysate containing lysed mammalian cells and intact microbial cells, if present; (c) filtering the first lysate through a filter having a pore size that retains the intact microbial cells but passes through the lysed mammalian cells; (d) providing conditions for lysing the retained microbial cells whereby at least a portion of the microbial cells are lysed and the analyte released therefrom; and (e) eluting the analyte from the filter to obtain an eluate comprising analyte released from the lysed microbial cells. In some embodiments, the conditions for lysing in step (d) include contacting the filter containing the retained microbial cells with a second lysis solution that is effective to lyse the microbial cells and release therefrom the analyte. In other, non-mutually exclusive embodiments, method 10 is performed with first fluidic system 100a.

In step S12, the sample containing or potentially containing mammalian cells and microbial cells is provided, for example, by dispensing sample into sample reservoir 104 or coupling a sample container (e.g., BD Vacutainer® (Becton Dickinson, Franklin Lakes, NJ)) to a sample inlet port of the first fluidic system 100a.

A range of samples containing or potentially containing mammalian cells and microbial cells may be analyzed in accordance with the present disclosure. In typical variations, a sample will be known to contain mammalian cells and will be at least suspected of containing one or more microorganisms. In some such variations, the sample has been isolated from a mammal. For example, particularly suitable samples for analysis using a method as disclosed herein are mammalian (e.g., human) blood samples for, e.g., blood sepsis pathogen detection. In other embodiments, a sample is not known to contain but is suspected of containing mammalian cells, such as a sample that is not isolated from a mammal but is derived from elsewhere (e.g., an environmental sample). The microbial cell can be any bacterial, archaeal, fungal, or protist species, particularly species characterized by a cell wall. Although in typical variations the microbial cell is a pathogenic microorganism or microorganism causing an infection in the body, the microbial cell may be pathogenic or non-pathogenic. In addition, the step of providing the sample need not encompass the isolation of the sample from a mammal or other source but may be performed by retrieving a sample from, e.g., a container where the sample is stored, or by initiating contact of the sample with the first lysis solution just prior to the mixing step (b).

In certain embodiments, the volume of the sample provided at step S12 is up to about 6 mL, up to about 5 mL, or up to about 4 mL. For example, in some variations, the volume of the sample is from about 0.5 mL to about 6 mL, from about 0.5 mL to about 5 mL, from about 1 mL to about 5 mL, from about 2 mL to about 5 mL, from about 2 mL to about 4 mL, from about 3 mL to about 5 mL, from about 3 mL to about 4 mL, or about 4 mL. In some embodiments comprising a sample volume as above, the sample is a blood sample (e.g., a blood sample for blood sepsis pathogen detection). In other, non-mutually exclusive embodiments comprising a sample volume as above, the first lysis solution is a lysis solution comprising a chaotropic salt (e.g., guanidine hydrochloride), saponin, and a polyoxyethylene surfactant (e.g., polysorbate 20) as described herein. In yet other, non-mutually exclusive embodiments comprising a sample volume as above, the filter is composed of polyethersulfone (PES) (e.g., a PES filter having a pore size of about 0.22 µm).

Non-limiting examples of microbes that may be targeted for analyte isolation in accordance with the present disclosure include gram-negative bacteria such as, for example, *Acinetobacter baumannii*, *Bacteroides fragilis*, Enterobacterales (e.g., *E. cloacae*, *E. coli*, *K. aerogenes*, *K. oxytoca*, *K. pneumoniae*, *Proteus*, *Salmonella*, *S. marcescens*), *Haemophilus influenzae*, *Neisseria meningitidis*, *Pseudomanas aeruginosa*, and *Stenotrophomonas maltophilia*; gram-positive bacteria such as, for example, *Enterococcus faecalis, Enterococcus faecium, Listeria monocytogenes, Staphylococcus* (e.g., *S. aureus, S. epidermis, S. lugdunensis*), and *Streptococcus* (e.g., *S. agalactiae, S. pneumoniae, S. pyogenes*); and yeast such as, for example, *Candida albicans, Candida auris, Candida glabrata, Candida krusei, Candida parapsilosis, Candida tropicalis, Cryptococcus neoformans,* and *Cryptococcus gatti*.

In step S14, sample is combined with a first lysis solution. In one example, step S14 is accomplished by (a) opening valve 50 to channel 10a, closing valves 52 and 54, and transporting an amount of sample via channels 10 and 10a from sample reservoir 104 to lysing chamber 108 and then (b) opening valve 52, closing valves 50 and 54, and transporting first lysis solution via channel 12 from first reservoir 106 to lysing chamber 108 to combine sample and first lysing solution within the lysing chamber 108. As previously indicated, the first lysis solution is capable of lysing the mammalian cells while leaving any microbial cells, including microbial cells of interest, intact. The lysis solution may be mixed with the sample at any suitable ratio, based on the lysis solution components and respective concentrations, to achieve effective concentrations of lysis solution components in the final mixture for selective lysis. Exemplary ratios of first lysis solution to sample include ratios of from about 3:1 to about 1:3, from about 2:1 to about 1:2, from about 1.5:1 to about 1:1.5, or about 1:1.

Typically, the first lysis solution comprises a chaotropic salt and a detergent. A particularly suitable chaotropic salt is guanidine hydrochloride, which may be present in the first lysis solution at, for example, a concentration of from about 1 M to about 8 M, from about 1 M to about 6 M, from about 1 M to about 5 M, from about 2 M to about 8 M, from about 2 M to about 6 M, from about 2 M to about 5 M, from about 3 M to about 8 M, from about 3 M to about 6 M, from about 3 M to about 5 M, or about 4 M. Suitable effective concentrations for guanidine hydrochloride (i.e., concentration in the first lysis reaction after mixing with the sample, or concentration in the final lysate) include, e.g., concentrations of from about 0.5 M to about 4 M, from about 0.5 M to about 3 M, from about 0.5 M to about 2.5 M, from about 1 M to about 4 M, from about 1 M to about 3 M, from about 1 M to about 2.5 M, from about 1.5 M to about 4 M, from about 1.5 M to about 3 M, from about 1.5 M to about 2.5 M, or about 2 M. Other suitable chaotropic salts include, e.g., guanidinium thiocyanate, urea, and lithium perchlorate.

A detergent for use in the first lysis solution may be a non-ionic detergent, an ionic detergent, or a zwitterionic detergent. Mild detergents and/or low detergent concentrations are typically used in order to keep microbial cells intact. Non-ionic detergents such as, for example, saponin or a polyoxyethylene surfactant are preferred. Saponin is particularly preferred and may present in the first lysis solution at, for example, a concentration of from about 1% (w/v) to about 10% (w/v), from about 2% (w/v) to about 8% (w/v), from about 2% (w/v) to about 6% (w/v), from about 3% (w/v) to about 5% (w/v), or about 4% (w/v); and saponin may be used at an effective concentration (i.e., concentration in the first lysis reaction after mixing with the sample, or concentration in the final lysate) of from about 0.5% (v/v) to about 5% (v/v), from about 1% (v/v) to about 4% (v/v), from about 1% (v/v) to about 3% (v/v), from about 1.5% (v/v) to about 2.5% (v/v), or about 2% (v/v). A particularly suitable polyoxyethylene surfactant is polysorbate 20 (Tween-20), which may present in the first lysis solution at, for example, a concentration of from about 1% (v/v) to about 10% (v/v), from about 2% (v/v) to about 8% (v/v), from about 2% (v/v) to about 6% (v/v), from about 3% (v/v) to about 5% (v/v), or about 4% (v/v); and polysorbate 20 may be used at an effective concentration of from about 0.5% (v/v) to about 5% (v/v), from about 1% (v/v) to about 4% (v/v), from about 1% (v/v) to about 3% (v/v), from about 1.5% (v/v) to about 2.5% (v/v), or about 2% (v/v). Other suitable detergents include, e.g., nonyl phenoxypolyethoxylethanol (NP-40), or a polyethylene oxide surfactant such as Triton X-100. In some embodiments of the method, the first lysis solution includes at least two detergents. For example, in some variations in which the first lysis solution comprises saponin, the lysis solution further contains polysorbate 20 as a second detergent.

In typical variations, the first lysis solution further contains a buffer, which is typically present at a concentration sufficient to maintain a pH of, for example, from about 6.0 to about 10.0, from about 6.5 to about 9.0, from about 7.0 to about 8.0, or from about 7.2 to about 7.6. Suitable buffers include Tris (2-amino-2-(hydroxymethyl)-1,3-propanediol), PIPES (piperazine-N,N'-bis(2-ethanesulfonic acid)), HEPES (4-(2-hydroxyethyl)-1-piperazineethanesulfonic acid), phosphate, citrate, succinate, and histidine. In certain embodiments, the buffer is Tris, which may be present in the first lysis solution at, for example, a concentration of from about 20 mM to about 200 mM, from about 30 mM to about 100 mM, from about 30 mM to about 50 mM, from about 35 mM to about 45 mM, or about 40.5 mM; and Tris may be used at an effective concentration (i.e., concentration in the first lysis reaction after mixing with the sample, or concentration in the final lysate) of from about 10 mM to about 100 mM, from about 15 mM to about 50 mM, from about 15 mM to about 25 mM, from about 18 mM to about 23 mM, or about 20.25 mM. Other suitable concentrations of buffers for formulations in accordance with the present disclosure can be readily determined by one of ordinary skill in the art.

The first lysis reagent and sample are admixed in step S14 to induce sufficient lysis of the mammalian cells to allow the resulting first lysate to pass through the filter, while leaving microbial cells, if present, sufficiently intact to remain trapped on the filter surface. Preferably all or substantially all (e.g., at least 80%) of the microbial cells present in the sample remain intact following selective lysis of the mammalian cells. In some variations, at least 90%, at least 95%, at least 96%, at least 97%, at least 98%, or at least 99% of the microbial cells in the sample remain intact. In typical variations, a separate incubation time prior to passing the lysate through the filter is unnecessary and sufficient lysis is achieved upon mixing of the first lysis reagent and sample. In other embodiments, a short incubation time prior to passing the lysate through the filter may be used (for example, an incubation time of no more than 10 minutes, no more than five minutes, or no more than one minute). Incubation may occur within the lysing chamber 108, and temperature ranges for the first lysis reaction include 5-50° C., 10-45° C., 15-37° C., 20-30° C., 22-27° C., or 25° C. Ambient (room) temperature is particularly suitable.

In some variations comprising lysis of blood samples with the first lysis solution, the first lysis solution includes guanidine hydrochloride, saponin, and polysorbate 20, wherein (i) the effective concentration of guanidine hydrochloride in the first lysis reaction is at least about 1.5 M, at least 1.8 M, or at least about 2 M, (ii) the effective concentration of saponin in the first lysis reaction is at least about 1.5% (w/v), at least about 1.8% (w/v), or at least about 2% (w/v), and (iii) the effective concentration of polysorbate 20 in the first lysis reaction is at least about 0.5% (v/v), at least about 1% (v/v), at least about 1.5% (v/v), or at least about 2% (v/v). Such variations are particularly suitable for lysis of blood samples with high leukocyte and thrombocyte count, inducing sufficient lysis to allow the resulting first lysate to pass through the filter (e.g., for lysis of laboratory-made buffy coat samples, which may have a normal leukocyte (WBC) count in the range of about 17,000-44,000/l, a erythrocyte (RBC) count of about 4×106/μl, and a thrombocyte (PLT) count in the range of about 1.2-2.1×106/μl).

In step S16, the first lysate obtained with the selective lysis of mammalian cells (step 14) is passed through a filter having a pore size that retains the intact microbial cells while passing the lysed mammalian material, thereby separating the intact microbial cells from the lysed mammalian cells. Portions of the first lysate that flows through the filter, including the lysed mammalian cells, may be collected, e.g., in a waste chamber. In one example, step S16 is accomplished by the opening valves 54 and 64, closing all other valves, and transporting the first lysate from the lysing chamber 108 via the channel 14 through the filter chamber 120 in the direction "A" and from the filter chamber 120 via the channel 22 to the waste chamber 118.

Filtration is performed using a filter having a suitable pore size to capture microbial cells of interest. The filter may have a pore size of about 1 μm or less, preferably a pore size of about 0.5 μm or less, and more preferably a pore size of 0.25 μm or less. In some variations, the filter has a pore size of from about 0.1 μm to about 1 μm, from about 0.1 μm to about 0.5 μm, from about 0.2 μm to about 1 μm, or from about 0.2 μm to about 0.5 km. In some embodiments, the filter has a pore size of about 0.22 μm. Suitable filter materials include, for example, polyethersulfone (PES), cellulose, nylon, polyvinylidene fluoride (PVDF), polycarbonate, and glass fiber (e.g., borosilicate glass fiber).

In some embodiments, the filter comprises an asymmetric structure. The asymmetric structure provides a kind of "built-in" prefilter and larger effective membrane area: the larger pores on an upstream side of the membrane trap larger particles on top of the membrane, whereas smaller particles are able to continue downstream to the interior or through the membrane, according to their size. The pore size gradually gets smaller from the upstream side of the membrane to the downstream side of the membrane, thus trapping particles to different parts of the membrane according to their sizes. In contrast, track-edged membranes gather all particles larger than the pore size to the same level, clogging the membrane more easily. Asymmetric filters may have a pore size from about 5 μm to about 20 μm on a first side of the asymmetric filter and a pore size of up to about 0.2 μm on a second side of the asymmetric filter.

Following the filtration step, the filter may, optionally, be washed in step S18 to remove residual lysis solution and mammalian cell debris before lysis of the intact microbial cells. Washing is typically performed by passing a wash buffer through the filter. In one example, optional step S18 is accomplished by the opening valves 58 and 64, closing all other valves, and transporting the wash buffer from the fifth reservoir 112 via the channel 18 through the filter chamber 120 in the direction "A" and from the filter chamber 120 via the channel 22 to the waste chamber 118.

Suitable wash buffers may include a detergent and may further include a chelating agent (e.g., 2,2',2",2"'-(Ethane-1,2-diyldinitrilo)tetraacetic acid (EDTA)). For example, in some variations, a wash buffer includes a non-ionic detergent such as, e.g., polysorbate 20; in some such embodiments, the wash buffer further includes Tris and/or EDTA. In other variations, a wash buffer does not contain a detergent. For example, in some such variations, the wash buffer contains sodium hydroxide, dimethyl sulfoxide (DMSO), glycerol, a chelating agent (e.g., EDTA), and a buffer (e.g., Tris). In more particular variations of a wash buffer without a detergent, the wash buffer is the same as the second lysis solution as described herein or is a diluted concentration of the wash buffer. In yet other embodiments, a wash buffer is a buffered solution selected from TE buffer, Tris buffered saline (TBS), and phosphate buffered saline (PBS).

Following filtration step S16 and optional washing step S18 of the filter, the retained, intact microbial cells are lysed using an on-filter lysis step S20. The intact microbial cells retained on the filter may be lysed by a chemical and/or physical lysis method to release microbial cell analytes from the intact organisms, thereby allowing the analytes to be released from the filter in the elution step. For example, lysis of the intact microbial cells may comprise (a) chemical lysis using a detergent, a chaotropic salt, an alcohol (e.g., glycerol), and/or an extreme pH value; (b) enzymatic lysis on the filter; (c) physical lysis using an externally controlled heat source embedded in the filter (e.g., induction-mediated heating, where electrically-conductive or semi-conductive material like brass, copper, steel, iron, aluminum, graphite, carbon, or silicon is embedded on/in the filter matrix by, e.g., lamination of a porous mesh or co-molding with the actual filter material); (d) physical lysis with direct electricity (electrolysis) where, e.g., conductive mesh structures are placed with lamination on both sides of the filter; (e) sonication/ultrasound with a sonotrode in contact with the filter; or (f) any combination of chemical, enzymatic, and/or physical lysis. In one example, the filter washing step is followed by application of enzyme to the filter, followed by a time/temperature incubation, followed by addition of a small volume of second lysis solution, followed by induction heating or sonication. In certain embodiments, the on-filter lysis step S20 comprises contacting the filter containing the retained microbial cells with a second lysis solution that is effective to lyse the microbial cells. In one example, step S20 is accomplished by the opening valves 56 and 64, closing all other valves, and transporting the second lysis solution from the second reservoir 110 via the channel 16 through the filter chamber 120 in the direction "A" and from the filter chamber 120 via the channel 22 to the waste chamber 118. The filter is incubated with the second lysis solution under conditions sufficient to induce lysis of the intact microbial cells and release analytes therefrom. In some embodiments comprising contacting the filter with a second lysis solution, the on-filter lysis step S20 further comprises induction heating and/or sonication.

In some preferred variations, the second lysis solution comprises sodium hydroxide and a buffer. In some such embodiments, sodium hydroxide is present in the second lysis solution at a concentration of from about 20 mM to about 500 mM, from about 35 mM to about 400 mM, from about 45 mM to about 300 mM, from about 50 mM to about 250 mM, from about 50 mM to about 150 mM, from about 50 mM to about 100 mM, from about 60 mM to about 150 mM, from about 60 mM to about 100 mM, or about 85 mM. Suitable buffers for use in the second lysis solution may include buffers as previously described for the first lysis solution; for example, in some variations, the buffer is Tris and is present in the second lysis solution at a concentration of from about 1 mM to about 50 mM, from about 2 mM to about 25 mM, from about 5 mM to about 10 mM, or about 7.5 mM. In some embodiments, a second lysis solution (e.g., a second lysis solution comprising sodium hydroxide as described above) contains dimethyl sulfoxide (DMSO) (e.g., at a concentration of from about 5% (v/v) to about 30%

(v/v), from about 5% (v/v) to about 25% (v/v), from about 10% (v/v) to about 30% (v/v), from about 10% (v/v) to about 25% (v/v), from about 10% (v/v) to about 20% (v/v), from about 15% (v/v) to about 20% (v/v), or about 18% (v/v)) and/or glycerol (e.g., at a concentration of from about 1% (v/v) to about 15% (v/v), from about 2% (v/v) to about 12% (v/v), from about 3% (v/v) to about 10% (v/v), from about 5% (v/v) to about 10% (v/v), or about 7% (v/v)). In certain variations, a second lysis solution (e.g., a second lysis solution comprising sodium hydroxide and further comprising one or both of DMSO and glycerol as described above) further includes a chelating agent; in some such variations, the chelating agent is EDTA and is present in the second lysis solution at a concentration of from about 0.1 mM to about 4 mM, from about 0.25 mM to about 3 mM, from about 0.5 mM to about 2 mM, or about 1 mM. In some embodiments, a second lysis solution as above consists or consists essentially of sodium hydroxide, DMSO, glycerol, the chelating agent, the buffer, and water.

In some variations wherein the on-filter lysis step comprises contacting the filter with a second lysis solution as above, the on-filter lysis step further comprises sonication. In some such embodiments, sodium hydroxide is present in the second lysis solution at a concentration of from about 20 mM to about 85 mM, from about 35 mM to about 85 mM, from about 20 mM to about 70 mM, from about 35 mM to about 70 mM, from about 20 mM to about 60 mM, from about 35 mM to about 60 mM, from about 20 mM to about 50 mM, or from about 35 mM to about 50 mM. In other, non-mutually exclusive embodiments comprising sonication, DMSO is present in the second lysis solution at concentration of from about from about 5% (v/v) to about 18% (v/v), from about 5% (v/v) to about 15% (v/v), from about 5% (v/v) to about 10% (v/v), from about 10% (v/v) to about 18% (v/v), or from about 10% (v/v) to about 15% (v/v).

In some variations of a method comprising use of a second lysis solution as above to lyse the intact microbial cells, the on-filter lysis step S20 may also include incubating the filter with the second lysis solution at a temperature of, for example, from about 80° C. to about 150° C. or from about 90° C. to about 130° C. Exemplary times for incubating the filter with the second lysis solution, optionally in the presence of heat and/or sonication, include 1-30 minutes, 2-20 minutes, 3-15 minutes, 4-12 minutes, 5-10 minutes, or 5-8 minutes. In other, non-mutually exclusive variations, the second lysis step includes sonication and/or electrolysis.

In certain variations comprising lysis with a second lysis solution as above, the second lysis solution contains DMSO and glycerol. Such embodiments are particularly preferred for improved lysis efficiency of certain microbes such as, for example, gram-positive bacteria (e.g., S. aureus) and yeast species (e.g., Candida such as C. albicans). Embodiments comprising DMSO and glycerol are also particularly suitable for co-directional elution of released analytes from the filter following lysis.

In some embodiments comprising lysis with a second lysis solution as above, lysis of the microbial cells further includes an enzymatic treatment step prior to contacting the filter with the second lysis solution. The enzymatic treatment step typically comprises contacting the filter containing the retained microbial cells with an enzyme solution that is effective to degrade one or more microbial cell wall components (e.g., peptidoglycan, chitin, proteins). Particularly suitable enzymes include mutanolysin, lyticase, lysozyme, endoglucanases, proteases, chitinases, and combinations thereof, to name a few. In some specific variations of the enzyme solution, mutanolysin is used at a concentration of from about 1 U/mL to about 1,000 U/mL, or from about 1 U/mL to about 500 U/mL. In some specific variations of the enzyme solution, lyticase is used at a concentration of about 1 U/mL to about 1,000 U/ml, or from about 1 U/mL to about 500 U/mL. In some specific variations of the enzyme solution, lysozyme is used at a concentration of about 1 U/mL to about 1,000 U/ml, or from about 1 U/mL to about 500 U/mL. In some specific variations the enzyme solution, at least two enzymes are used, wherein mutanolysin is used at a concentration from about 0 U/mL to about 1,000 U/mL, and lyticase is used at a concentration from about 0 U/mL to about 1,000 U/mL, and lysozyme is used at a concentration from about 0 U/mL to about 1,000 U/mL. Typically, once the enzyme solution is added to the to the filter, filter is incubated with the enzyme solution at a suitable temperature (e.g., between 20° C. to 50° C.). Exemplary times for incubating the filter with the enzyme solution include 5-30 minutes, 5-25 minutes, 5-20 minutes, or 10-20 minutes (e.g., 15 minutes). In variations further comprising a washing step (step S18) following filtration of the first lysate as described above, the enzymatic treatment of the filter is typically performed after the washing step. Mutanolysis (available, for example, from Sigma-Aldrich as catalog number SRE0007) has a stock specific activity of about 4,000 U/mg protein wherein "[o]ne unit will produce a AA600 of 0.01 per minute at pH 6.0 at 37° C. in a 1 mL volume using a suspension of *Streptococcus faecalis* cell wall as substrate." Lysozyme (available, for example, from Sigma-Aldrich as catalog number L4919) has a stock specific activity of about 40,000 U/mg protein wherein "[o]ne unit will produce a AA450 of 0.001 per min at pH 6.24 at 25° C., using a suspension of *Micrococcus lysodeikticus* as substrate, in a 2.6 mL reaction mixture (1 cm light path)." Lyticase (available, for example, from A&A Biotechnology, μl. Strzelca 40, 80-299 Gdansk, Poland (cat. no. 1018)) has a stock concentration of 10 U/μL wherein "[o]ne unit will produce a AA800 of 0.001 per min at pH 7.5 at 25° C., using a suspension of *S. cerevisiae* as substrate in 3 mL reaction mixture."

Following on-filter lysis of the intact microbial cells (step S20), released analytes are recovered from the filter in step S22. Recovered analytes may be collected in a downstream container or in a reservoir for further processing (such as performing an assay) on the analytes. An exemplary analyte recovery method includes eluting the analyte from the filter by passing an immiscible liquid through the filter to push an eluate containing analytes out of the filter. Elution with an immiscible liquid is particularly suitable when recovering hydrophilic analytes such as, for example, nucleic acids, since hydrophilic analytes are retained with the aqueous liquid content pushed out of the filter. In addition, the use of an immiscible liquid for the elution step is advantageous as the aqueous phase recovered from the filter is not diluted with the elution fluid, thereby avoiding dilution of low copy number analytes. As the immiscible liquid does not mix with the aqueous phase from the filter, excess amounts of the immiscible liquid may be used, and the aqueous eluate can be readily separated from the immiscible liquid for use in downstream assays. Suitable immiscible liquids include oils and hydrocarbons, such as mineral oil, silicone oil, essential oils, hexadecane, or combinations of two or more oils to name of few. In alternative variations, an aqueous elution buffer may be passed through the filter for the elution step; in some such embodiments, the elution buffer is the same as the second lysis solution described herein. In other variations, an aqueous elution buffer is selected from TE buffer, TBS, and PBS.

When passing an elution fluid through the filter, the direction of fluid flow may be the same as the direction of fluid flow applied in the filtering step (also referred to herein as "co-directional elution"). Alternatively, the direction of fluid flow during elution is opposite the direction of fluid flow applied in the filtering step (also referred to herein as "reverse-flow elution"). Reverse-flow elution may be advantageous, for example, in certain variations comprising use of an asymmetric filter membrane, where intact microbes are captured on the side of the membrane with the largest pores as sample and the first lysis solution are passed through the filter. Using reverse-flow elution in such variations can facilitate elution of partly lysed microbes as the partly lysed microbes do not need to pass through the filter membrane surface with the smallest pores. Reverse-flow elution may increase downstream assay sensitivity in certain embodiments.

In one example, step S22 co-directional elution is accomplished by opening valve 60 to channel 20a, opening valve 62 to channel 24a, closing all other valves, and transporting the elution reagent from the third reservoir 116 via the channels 20 and 20a through the filter chamber 120 in the direction "A" and from the filter chamber 120 via the channels 24a and 24 to the elution chamber 124. Conversely, step S22 reverse-flow elution is accomplished by opening valve 60 to channel 20b, opening valve 62 to channel 24b, closing all other valves, and transporting the elution reagent from the third reservoir 116 via the channels 20 and 20b through the filter chamber 120 in the direction "B" and from the filter chamber 120 via the channels 24b and 24 to the elution chamber 124.

Following recovery (and, if an immiscible liquid is used, after separation of the eluate from the immiscible liquid), in optional step S24, the eluate may be neutralized by adding a suitable neutralizing buffer. In one example, step S24 is accomplished by opening valve 66, closing all other valves, and transporting neutralizing buffer via channel 26 from fourth reservoir 114 to elution chamber 124.

For example, in certain embodiments comprising the use of sodium hydroxide in the second lysis solution as described herein, a neutralizing buffer contains hydrochloric acid and Tris (e.g., a 20× neutralizing buffer comprising HCl at a concentration of about 500 mM and Tris at a concentration of about 50 mM).

Isolating an Analyte Using Immiscible Liquid Elution

Figure 3:
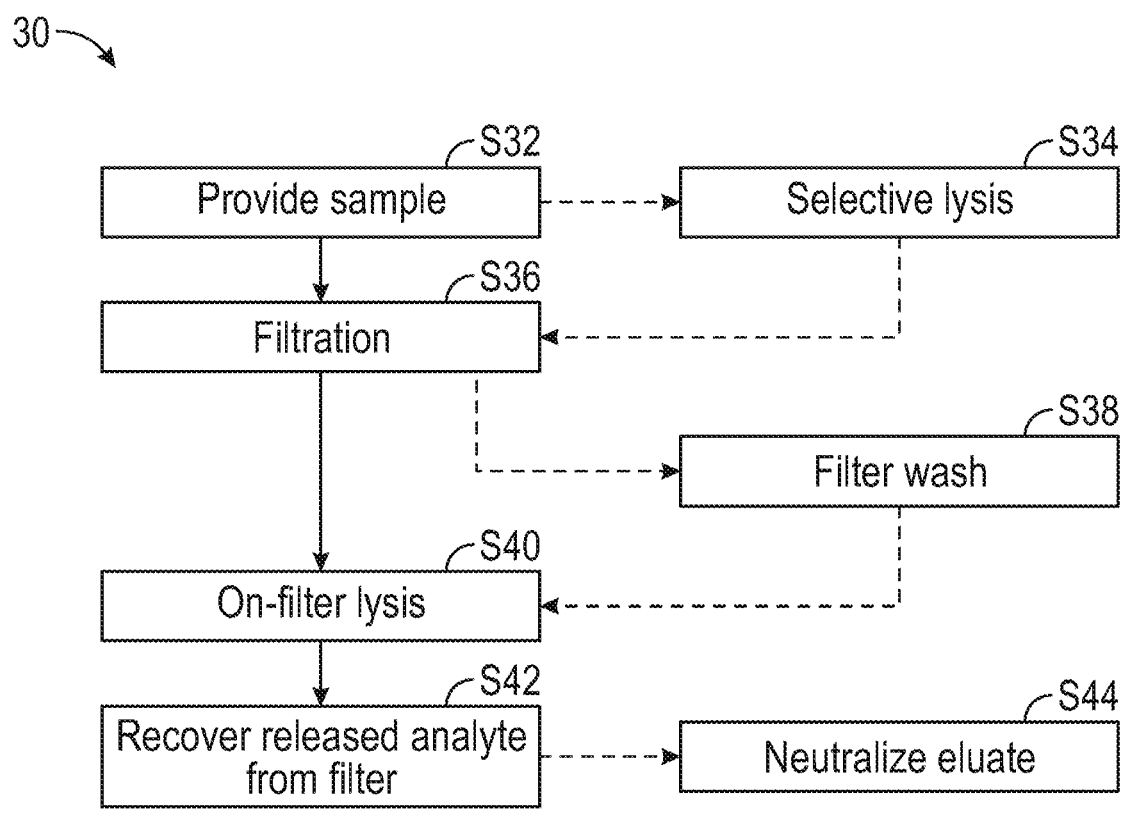
FIG. 3 is a flow chart illustrating a method for isolating an analyte from a sample using immiscible liquid elution in accordance with the present disclosure.

FIG. 3 is a flow chart illustrating a method 30 for isolating an analyte from a sample using immiscible liquid elution in accordance with the present disclosure. In an embodiment, method 30 may generally include the following steps: (a) providing a sample containing or potentially containing intact cells; (b) filtering the sample through a filter having a pore size that retains the intact cells; (c) providing conditions for lysing cells retained on the filter whereby at least a portion of the cells are lysed and the analyte released therefrom; and (d) passing an immiscible liquid through the filter to push an eluate containing the analyte out of the filter. In some embodiments, the conditions in step (c) include contacting the filter containing the retained cells with a lysis solution that is effective to lyse the cells, possibly in combination with one or more of heat or sonication, and release therefrom the analyte.

In step S32, the sample containing or potentially containing intact mammalian cells and microbial cells is provided, for example, by dispensing sample into sample reservoir 104 or coupling a sample container (e.g., BD Vacutainer® (Becton Dickinson, Franklin Lakes, NJ)) to a sample inlet port of the first fluidic system 100a.

In some variations wherein the intact cells of interest are microbial cells, the method further includes a selective lysis step S34 before filtering the sample, wherein the selective lysis step comprises selectively lysing any mammalian cells in the sample while leaving the microbial cells intact. In certain embodiments, the selective lysis step is performed as described above in the context of methods for microbe enrichment using selective lysis. In one example, step S34 is accomplished by (a) opening valve 50 to channel 10a, closing valves 52 and 54, and transporting an amount of sample via channels 10 and 10a from sample reservoir 104 to lysing chamber 108 and then (b) opening valve 52, closing valves 50 and 54, and transporting first lysis solution via channel 12 from first reservoir 106 to lysing chamber 108 to combine sample and first lysing solution within the lysing chamber 108.

Following step S32 or step S34, in step S36 filtration is performed using a filter having a suitable pore size to capture the cells of interest. In some variations, such as for capture of microbial cells, the filter has a pore size of about 1 μm or less, a pore size of about 0.5 μm or less, or a pore size of about 0.25 μm or less (e.g., a pore size of from about 0.1 μm to about 1 μm, from about 0.1 μm to about 0.5 μm, from about 0.2 μm to about 1 μm, from about 0.2 μm to about 0.5 μm, or about 0.22 μm). Suitable filter materials include, for example, polyethersulfone (PES), cellulose, nylon, polyvinylidene fluoride (PVDF), polycarbonate, and glass fiber (e.g., borosilicate glass fiber). In some embodiments, the filter comprises an asymmetric structure. In certain variations, pores on a first side of the asymmetric filter have a size from about 5 μm to about 20 μm and pores on a second side of the asymmetric filter have a size of up to about 0.2 μm.

In one example, where step S36 follows step S32, and step S34 is omitted, step S36 is accomplished by the opening valve 50 to channel 10b, opening valve 64, closing all other valves, and transporting the sample from the sample reservoir 104 via the channels 10 and 10b through the filter chamber 120 in the direction "A" and from the filter chamber 120 via the channel 22 to the waste chamber 118.

In another example, where step S36 follows step S34, step S36 is accomplished by the opening valves 54 and 64, closing all other valves, and transporting the first lysate from the lysing chamber 108 via the channel 14 through the filter chamber 120 in the direction "A" and from the filter chamber 120 via the channel 22 to the waste chamber 118.

Following the filtration step, the filter may optionally be washed in step S38 before lysis of the intact cells. A washing step may be desirable if, for example, the filter contains substances that would be inhibitory to downstream processing. Washing is typically performed by passing a wash buffer through the filter. Suitable wash buffers include wash buffers as described above in the context of methods for microbe enrichment using selective lysis. In one example, optional step S38 is accomplished by the opening valves 58 and 64, closing all other valves, and transporting the wash buffer from the fifth reservoir 112 via the channel 18 through the filter chamber 120 in the direction "A" and from the filter chamber 120 via the channel 22 to the waste chamber 118.

Following filtration step S36 and optional washing step S38, the retained, intact cells are lysed using an on-filter lysis step S40. The intact cells may be lysed by a chemical and/or physical lysis method to release analytes, thereby allowing the analytes to be released from the filter in the elution step. For example, lysis of the intact cells may comprise chemical lysis using a detergent, a chaotropic salt, an alcohol (e.g., glycerol), and/or an extreme pH value; enzymatic lysis on the filter; physical lysis using an externally controlled heat source embedded in the filter (e.g., induction-mediated heating, where electrically-conductive or semi-conductive material like brass, copper, steel, iron, aluminum, graphite, carbon, or silicon is embedded on/in the filter matrix be, e.g., lamination of a porous mesh or co-molding with the actual filter material); physical lysis with direct electricity (electrolysis) where, e.g., conductive mesh structures are placed with lamination on both sides of the filter; sonication/ultrasound with a sonotrode in contact with the filter; or any combination of chemical, enzymatic, and/or physical lysis.

In some embodiments, the on-filter lysis step S40 comprises contacting the filter containing the retained cells with a lysis solution that is effective to lyse the cells, and the filter may be incubated with the lysis solution under conditions sufficient to induce lysis of the intact cells and release analytes therefrom. Lysis solutions particularly suitable for, e.g., lysis of microbial cells, are "second" lysis solutions as described above in the context of methods for microbe enrichment. In one example, step S40 is accomplished by the opening valves 56 and 64, closing all other valves, and transporting the second lysis solution from the second reservoir 110 via the channel 16 through the filter chamber 120 in the direction "A" and from the filter chamber 120 via the channel 22 to the waste chamber 118.

In some variations comprising lysis of intact microbial cells, the on-filter lysis step S40 includes incubating the filter with the lysis solution at a temperature of, for example, from about 80° C. to about 130° C. or from about 90° C. to about 130° C. Exemplary times for incubating the filter with the lysis solution, optionally in the presence of heat and/or sonication, include 1-30 minutes, 2-20 minutes, 3-15 minutes, 4-12 minutes, 5-10 minutes, or 5-8 minutes. In other, non-mutually exclusive variations comprising lysis of intact microbial cells, the lysis step includes sonication and/or electrolysis.

In some embodiments comprising on-filter lysis of microbial cells with a lysis solution as above, lysis of the microbial cells further includes an enzymatic treatment step prior to contacting the filter with the lysis solution. The enzymatic treatment step typically comprises contacting the filter containing the retained microbial cells with an enzyme solution that is effective to degrade one or more microbial cell wall components (e.g., peptidoglycan, chitin, proteins). Particularly suitable enzymes include mutanolysin, lyticase, lysozyme, endoglucanases, proteases, chitinases, and combinations thereof, to name a few. In some specific variations of the enzyme solution, mutanolysin is used at a concentration of from about 1 U/mL to about 1,000 U/mL, or from about 1 U/mL to about 500 U/mL. In some specific variations of the enzyme solution, lyticase is used at a concentration of about 1 U/mL to about 1,000 U/ml, or from about 1 U/mL to about 500 U/mL. In some specific variations of the enzyme solution, lysozyme is used at a concentration of about 1 U/mL to about 1,000 U/ml, or from about 1 U/mL to about 500 U/mL. In some specific variations the enzyme solution, at least two enzymes are used, wherein mutanolysin is used at a concentration from about 0 U/mL to about 1,000 U/mL, and lyticase is used at a concentration from about 0 U/mL to about 1,000 U/mL, and lysozyme is used at a concentration from about 0 U/mL to about 1,000 U/mL. Typically, once the enzyme solution is added to the to the filter, filter is incubated with the enzyme solution at a suitable temperature (e.g., between 20° C. to 50° C.). Exemplary times for incubating the filter with the enzyme solution include 5-30 minutes, 5-25 minutes, 5-20 minutes, or 10-20 minutes (e.g., 15 minutes). In variations further comprising a washing step (step S38) following filtration of the first lysate as described above, the enzymatic treatment of the filter is performed after the washing step.

Following on-filter lysis of the intact cells (step S40), released analytes are recovered from the filter in step S42. Recovered analytes may be collected in a downstream container or in a reservoir for further processing (such as performing an assay) on the analytes. An exemplary analyte recovery method includes eluting the analyte from the filter by passing an immiscible liquid through the filter to push an eluate containing analytes out of the filter. As previously noted, elution with an immiscible liquid is particularly suitable when recovering hydrophilic analytes such as, for example, nucleic acids, since hydrophilic analytes are retained with the aqueous liquid content pushed out of the filter. In addition, the use of an immiscible liquid for the elution step is advantageous as the aqueous phase recovered from the filter is not diluted with the elution fluid, thereby avoiding dilution of low copy number analytes. As the immiscible liquid does not mix with the aqueous phase from the filter, excess amounts of the immiscible liquid may be used, and the aqueous eluate can be readily separated from the immiscible liquid for use in downstream assays.

In some embodiments, the immiscible liquid has a lower density relative to the aqueous phase being pushed out from the filter, thereby allowing the immiscible liquid to stay above the aqueous phase (for example, in embodiments comprising use of a lysis solution at step (c), the immiscible liquid may have a lower density relative to the lysis solution). Suitable immiscible liquids include oils and hydrocarbons, such as mineral oil, silicone oil, and hexadecane, to name of few. Typically, enough immiscible liquid is used so that some of the immiscible liquid is also pushed out of the filter. When passing the immiscible liquid through the filter, either co-directional elution or reverse-flow elution may be used.

In one example, step S42 co-directional elution is accomplished by opening valve 60 to channel 20a, opening valve 62 to channel 24a, closing all other valves, and transporting the elution reagent from the third reservoir 116 via the channels 20 and 20a through the filter chamber 120 in the direction "A" and from the filter chamber 120 via the channels 24a and 24 to the elution chamber 124. Conversely, step S42 reverse-flow elution is accomplished by opening valve 60 to channel 20b, opening valve 62 to channel 24b, closing all other valves, and transporting the elution reagent from the third reservoir 116 via the channels 20 and 20b through the filter chamber 120 in the direction "B" and from the filter chamber 120 via the channels 24b and 24 to the elution chamber 124.

Following elution separation of the eluate from the immiscible liquid, in an optional step S44, the eluate may be neutralized by adding a suitable neutralizing buffer (e.g., a neutralizing buffer as described above in the context of methods for microbe enrichment using selective lysis). In one example, step S44 is accomplished by opening valve 66, closing all other valves, and transporting neutralizing buffer via channel 26 from fourth reservoir 114 to elution chamber 124.

Analyte Isolation Detection

Following release and recovery of cell analytes, a method for isolating an analyte as above may further include analyzing the isolated analyte. The type of assay depends on the analyte.

For example, in some variations wherein the analyte is a nucleic acid, analyzing the isolated nucleic acid includes amplification. In such embodiments, the isolated nucleic acid analyte is used as a template in an in vitro nucleic acid amplification reaction, utilizing at least two amplification oligomers flanking a target sequence within the nucleic acid analyte, to generate an amplification product corresponding to the target sequence. A nucleic acid analyte can be amplified using methods such as isothermal amplification reactions (e.g., transcription mediated amplification (TMA), nucleic acid sequence-based amplification (NASBA), loop mediated isothermal amplification (LAMP), polymerase spiral reaction (PSR) (Liu et al., Sci. Rep. 5:12723, 2015), ligase chain reaction (LCR), and other isothermal amplification methods), or temperature cycling amplification reactions (e.g., polymerase chain reaction (PCR) or other temperature cycling amplification methods), or other amplification methods. In particular embodiments comprising PCR, the PCR is selected from quantitative PCR (qPCR) and real time PCR (rt-PCR).

Amplification may be performed with or without prior capture of the nucleic acid analyte. In some variations comprising a capture step, the isolated nucleic acid analyte is captured by hybridizing the nucleic acid to an immobilized capture probe attached to a solid support prior to the amplification step.

Detection of the amplified nucleic acid analyte products can be performed during amplification (real-time) or following amplification (end-point) by using any known method. Amplified nucleic acids may be detected in solution phase or by immobilizing them on a solid support (e.g., a nucleic acid array) and detecting labels associated with them (e.g., an intercalating agent such as ethidium bromide). Some detection methods use detection probes complementary to a sequence in the amplified product and detect the presence of the probe:product complex (e.g., by detecting a label joined to the probe), or use a complex of probes to amplify the signal detected from amplified products (see, e.g., U.S. Pat. Nos. 5,424,413, 5,451,503 and 5,849,481). Other detection methods use a probe in which signal production is linked to the presence of the target sequence because a change in signal results only when the labeled probe binds to amplified product, such as in a molecular beacon, molecular torch, or hybridization switch probe (e.g., U.S. Pat. Nos. 5,118,801, 5,210,015, 5,312,728, 5,538,848, 5,541,308, 5,656,207, 5,658,737, 5,925,517, 6,150,097, 6,361,945, 6,534,274, 6,835,542, and 6,849,412; and U.S. Pub. No. 2006/0194240 A1). Such probes typically use a label (e.g., fluorophore) attached to one end of the probe and an interacting compound (e.g., quencher) attached to another location of the probe to inhibit signal production from the label when the probe is in one conformation ("closed") that indicates it is not hybridized to amplified product, but a detectable signal is produced when the probe is hybridized to the amplified product which changes its conformation (to "open"). Detection of a signal from directly or indirectly labeled probes that specifically associate with the amplified product indicates the presence of the target nucleic acid that was amplified.

In particular variations, an amplification and detection assay for analyzing isolated nucleic acid is a qPCR assay. Such assays include forward and reverse primers for target amplification, and a target-specific detection probe labeled with a fluorophore at the 5'-end and a quencher at the 3'-end (also referred to as a hydrolysis probe or TaqMan probe). In this format, the quencher disables the fluorophore emission. If the target nucleic acid is present in the sample, the probe binds to the complementary sequence within the amplification target region. As the polymerase extends the 3'-end of the primer and synthesizes a nascent complementary strand, the 5' to 3' exonuclease activity of the polymerase degrades the bound probe, thus disabling the quencher's effect on fluorophore. This is seen in increasing fluorescence intensity, according to amplification rate.

Figure 4:
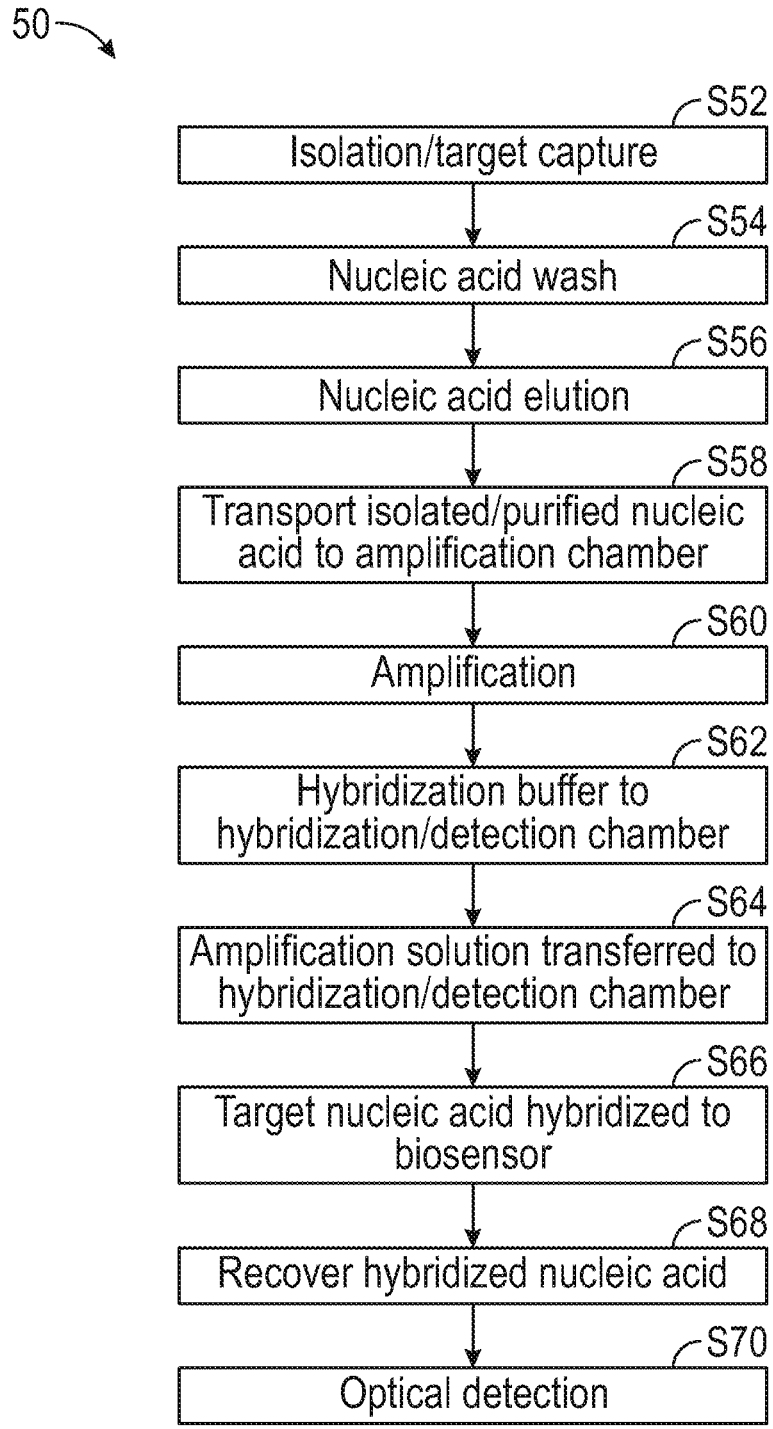
FIG. 4 is a flow chart showing a method for detecting a target nucleic acid from within the isolated analyte.

FIG. 4 is a flow chart showing a method 50 for analyzing an analyte (e.g., nucleic acid) received from the lysis process, for example, by isolating, amplifying, and detecting a target nucleic acid, for example, as is described in U.S. Pat. No. 10,654,039.

For a process in which capture of the nucleic acid is performed prior to amplification, target capture or isolation is performed in step S52. In one example, step S52 is accomplished by selectively connecting elution chamber 124 to target isolation chamber 126 (for example, by opening valve 68 while valves 70, 72, 76, and 78 are closed) and transporting eluate via channel 28 from elution chamber 124 to target isolation chamber 126, where the eluate is put into contact with a target capture reagent typically present in the in the target isolation chamber. In an alternate embodiment, eluate is transported directly from the filter chamber 120 to the target isolation chamber 126 without first being received in an intermediate elution chamber. The target isolation chamber 126 may contain a binding substrate or membrane, such as a silica-like membrane for nucleic acid binding. According to various embodiments, target isolation chamber 126 may, for example, contain a gel, beads, or a paper filter for nucleic acid binding and concentration. As a matter of illustration, agarose gel, silica beads and/or filter paper, such as cellulose.

Once the binding to the binding substrate or membrane is completed, the waste chamber 132 is selectively connected to the target isolation chamber 126 (for example, by opening valve 70 and closing valves 68, 72,76, and 78), and a portion of the sample containing unbound, non-target analyte is transported from the target isolation chamber 126 to the waste chamber 132 via channel 30, while the captured, target nucleic acid is retained within isolation chamber 126.

In step S54, bound target nucleic acid within target isolation chamber 126 is recovered by washing it in order to remove inhibitors and purify the nucleic acid. In one example, step S54 is accomplished by selectively connecting wash buffer reservoir 134 to target isolation chamber 126 (for example, by opening valve 76 and closing valves 68, 70, 72, and 78), transporting wash buffer via channel 36 from wash buffer reservoir 134 to target isolation chamber 126, and washing the binding membrane within the target isolation chamber 126 with the wash buffer. In an embodiment, the same operation may be repeated with a second DNA wash buffer contained in another wash buffer reservoir (not shown). Used wash buffer may be directed to waste chamber 132 by selectively connecting waste chamber 132 to isolation chamber 126 (for example, by opening valve 70 while valves 68, 72,76, and 78 are closed) and transporting used wash buffer from the target isolation chamber 126 to the waste chamber 132 via channel 30.

In step S56, the nucleic acid bound to the binding membrane is eluted with an elution buffer, which may also include an amplification reagent. In an embodiment, elution buffer/amplification reagent reservoir 136 is selectively connected to target isolation chamber 126 (for example, by opening valve 78 and closing valves 68, 70, 72, and 76) and elution buffer is transported from elution buffer/amplification reagent reservoir 136 via channel 38 to target isolation chamber 126 to elute the nucleic acid bound to the binding membrane. An amplification-mix solution contained in the elution buffer/amplification reagent reservoir 136 can be used as an elution buffer.

At the end of step S56, an isolated nucleic acid sample remains.

In step S58, after elution, the amplification chamber 128 is selectively connected to the target isolation chamber 126 (for example, by opening valve 72 while valves 68, 70, 76, and 78 are closed) and the isolated nucleic acid is transported via channel 32 from target isolation chamber 126 to the amplification chamber 128 for amplification. As noted, the step of isolating and purifying an analyte of interest within the second fluidic system 100b may be omitted, and thus, steps S52, S54, and S56 may be viewed as optional, depending on the protocol employed. In such an embodiment, lysed microbial analyte from the first fluidic system 100a is delivered to the amplification chamber 128, either directly from the filter chamber 120 or from the elution chamber 124. In such an arrangement, amplification reagents may be pre-stored in the amplification chamber 128 or may be transferred to the amplification chamber 128 from a separate amplification reagent reservoir, before or after sample material is transferred into the amplification chamber 128.

In some embodiments, the isolated nucleic acid sample amplification-mix is transferred to a metering chamber prior to transfer to the amplification chamber 128, in order to calibrate the proper volume to be injected in the said amplification chamber. In some embodiments at step S60, a nucleic acid amplification reaction may be performed in amplification chamber 128.

In step S60, a nucleic acid amplification in amplification chamber 128 may be performed by standard amplification protocols (typically any amplification method, including but not limited to, polymerase chain reaction (PCR), reverse transcriptase PCR, isothermal amplification, and other amplification protocols, including those described above) achieving a very good sensitivity and specificity up to 20 markers. In an embodiment, a set of primers may have been immobilized (e.g., lyophilized) within amplification chamber 128 during the cartridge manufacturing process. These primers may re-suspended when the amplification-mix is transferred to amplification chamber 128. The amplification-mix may contain polymerase, nucleotides, and reaction buffers at suitable concentrations for efficient amplification of nucleic acid templates. At the end of step S60, one obtains an amplified nucleic acid sample, provided target nucleic acid was originally present in the sample.

In step S62, hybridization buffer reservoir 138 is selectively connected to hybridization/detection chamber 130 (for example, by opening valve 82 while valves 74 and 80 are closed) and hybridization buffer is transported from hybridization buffer reservoir 138 via channel 42 to hybridization/detection chamber 130.

Next, in step S64, amplification chamber 128 is selectively connected to hybridization/detection chamber 130 (for example, by opening valve 74 while valves 72, 80, and 82 are closed) and amplification solution is transported via channel 34 from amplification chamber 128 to hybridization/detection chamber 130, thereby putting the amplified nucleic acid sample in contact with the hybridization buffer transferred in step S62.

In step S66, the amplified DNA sample may be placed into contact with the affinity biosensor (e.g., the biochip) within the hybridization/detection chamber 130 in such a way that complementary sequences can be combined with an immobilized probe, for example by hybridization, association, or linking to the probe. After the removal of non-associated material, the associated sequences are ready for detection and measurement.

In one embodiment, in step S66 the amplified nucleic acid sample is hybridized, for a period of several minutes, e.g., about 30 minutes, in the hybridization/detection chamber 130.

In step S68, hybridization wash buffer reservoir 140 is selectively connected to hybridization/detection chamber 130 (for example, by opening valve 80 while valves 74 and 82 are closed) and hybridization wash buffer is transported via channel 40 from the hybridization wash buffer reservoir 140 to hybridization/detection chamber 130 to recover hybridized nucleic acid. A hybridized nucleic acid sample is therefore obtained.

In a variant of the analysis method, a DNA melting procedure at the end of hybridization may be added and would allow an increase in detection specificity.

In step S70, an array image is obtained and analyzed. The detection of the interaction between the target nucleic acids and the probes of the biosensor are performed by an optical detection device. The localized hybridization may be detected by, e.g., the emission of a chromogenic signal. Herein, "chromogenic signal" is to be understood as any light signal emitted directly, or indirectly, after excitation by a suitable light source or after chemical or enzymatic transformation. Chromogenic signals include colorimetric signals, photoluminescent signals, fluorescent signals, chemiluminescent signal, bioluminescent signals, and the like. Such signals are either directly emitted by the molecules of interest, or emitted by detectable elements (tags), which are added and/or grafted thereto.

The processing device to which the second fluidic system 100b is coupled may include an optical detector, such as a fluorescence reader configured to obtain a fluorescent image of the biosensor surface. For that purpose, the biosensor is illuminated (excited) with a light source at the wavelength of excitation of the fluorophore marking the target molecules, and an adapted optical system forms an image of the fluorescence of the biosensor at the wavelength of emission of the fluorophores. The light intensity of each point of this image is related to the quantity of fluorophores present at the corresponding point of the affinity biosensor, which is itself proportional to the number of target molecules that have been selectively attached at this place during the hybridization phase, which makes it possible to collect information (often quantitative) about the nucleic acid content of the sample.

EXAMPLES

The following examples are provided to illustrate certain disclosed embodiments and are not to be construed as limiting the scope of this disclosure in any way.

Example 1

In this study, a pathogen enrichment protocol using set concentrations of NaOH, glycerol, and EDTA was evaluated with different elution techniques.

In a previous study where oil elution was tested, initial experiments with glycerol and increased EDTA were done. According to Zhang et al. (*Lett. Appl. Microbiol.* 51:114-118, 2010), a sodium phosphate/EDTA/glycerol solution is capable of lysing yeast cells, but when this lysis solution was studied using on-filter lysis, detectivity of *C. albicans* and *S. aureus* was low. Glycerol and increased EDTA was then added to an NaOH solution, which gave promising improvement for detection with co-directional elution.

In this study, a lysis solution containing 85 mM NaOH, 1 mM EDTA, 7% (v/v) glycerol was evaluated using the following elution methods: 1) co-directional elution with oil after heating the filter in oven (98° C. for 30 minutes); 2) co-directional elution with oil after heating the filter in a specific filter holder where the heating element is in direct contact with the filter; 3) co-directional elution with lysis buffer after heating the filter in oven at 98° C. for 30 minutes; and 4) reverse flow elution with oil after heating the filter in oven at 98° C. for 30 minutes.

The protocol used in this study is summarized below.
1) Mix blood sample well by inverting tube>30 times.
2) Take 4 ml of blood sample to 50 ml falcon tube. Spike centrifuged (9500 rpm/min, 10 min)+washed pathogens to 50 cfu/ml (20 µl from 10^4 cfu/ml stock), mix gently.
3) Add 4 ml of hemolysis solution (4 M Gu-HCl, 4% Tween-20 (v/v), 4% saponin, 40.5 mM Tris-HCl) and mix 25 times by slowly pipetting back and forth.
4) Take the lysed blood sample into a 10 ml syringe by using a syringe needle. Remove air completely. Attach the syringe to the filter directly in a 90° angle. Filter the blood through.
5) Wash the filter by filtering through 15 ml of GENT-solution at ~20 ml/min speed.
6) Cap the filter and place it to filter heating holder. The following induction heating protocol was run: heat filter to 50° C. and keep it for 40 seconds; increase heat to 70° C. and keep it for 20 seconds; increase the heat to 90° C. and keep it for 5 minutes. Let cool for few minutes, then remove from heating holder.
7) Elute by connecting 1.2 ml syringe with mineral oil (1, 2, and 4) or 300 µl of lysis buffer (3) to the filter inlet (1, 2, 3) or outlet (4) and steadily press oil or lysis buffer through the filter. Collect the outcoming liquid to a tube.
8) For oil elution eluate (1, 2, and 4), separate the lower phase of miscible liquid from oil.
9) Neutralize the eluate by adding 20× Neutralizer (500 mM HCl, 50 mM Tris) and checking the pH with pH test strips. Aim for pH 8.5. (Approximately 40 µl of 20× Neutralizer needed for 250 µl of eluate.)

Results are shown in Table 1 below.

TABLE 1

| Test Condition | Average Cqs (No. of pos) | | |
| --- | --- | --- | --- |
| | S. pneumoniae gyrB | S. aureus gyrB | C. albicans |
| 1) Co-directional elution with oil after oven incubation | 39.1 (3/8) | 38.6 (4/8) | 38.9 (2/8) |
| 2) Co-directional elution with oil after filter holder heat | 38.9 (2/8) | 38.3 (2/8) | 39.3 (1/8) |
| 3) Co-directional elution with lysis buffer after oven incubation | 38.8 (1/12) | 38.7 (3/12) | 39.4 (4/12) |
| 4) Reverse flow elution with oil after oven incubation | 38.5 (4/8) | 38.7 (1/8) | 38.2 (8/8) |
| Pos control = 150 cfu/ml cell lysate (5xHotShot) | 38.7 (7/8) | 39.9 (2/8) | 39.1 (7/8) |
| NTC | — | — | — |

*S. aureus* detection performed well using co-directional elution with oil as compared to positive control. *S. pneumoniae* did not perform well, suggesting that *Streptococcus* cell wall structure is stronger than *Staphylococcus* against lysis with this chemistry.

From the *Candida* results it is clearly seen that reverse flow oil elution collected very efficiently the yeast cells located on the membrane (4). In reverse-flow elution, cells captured on top of the membrane are readily available to come out. In co-directional elution (1, 2, 3), non-lysed cells are not capable of coming out as they would need to go through the membrane. Therefore, these data suggest that this chemistry plus heating is not capable of efficiently lysing the cells and releasing the nucleic acids of *Candida* (nor *S. pneumoniae*) and thus results after co-directional elution is poor. But using reverse-flow elution, the non-lysed cells can be collected. Detection is thus improved as PCR thermal cycling provides further stress to the sensitized cells releasing the DNA for amplification.

It is seen that lysis was not optimal for Gram-positive bacteria (notably *S. pneumoniae*) as reverse-flow elution didn't give as good result as with *Candida*. The size of the Gram-positive bacteria enables the microbes to go inside the pores of asymmetric membrane structure (gradual decrease down to 0.2 µm). When reverse-flow elution is done, either the microbes are not capable of coming out from the membrane pores or they come out but are still so firmly intact that further stress in PCR thermal cycling cannot break them. The size of *Candida* is bigger and thus the cells are located more on top of the membrane (not inside). Thus, in reverse-flow elution the *Candida* cells come out and give detection in PCR. The results show benefits of reverse-flow for *Candida* and capability to be broken by further stress in PCR. As an optimal protocol that will provide good detection for all tested microbes is not yet seen here, further chemistry improvements or lysis stress is needed to enable either full lysis in the filter with co-directional elution or partial lysis with reverse-flow before further stress for complete lysis in downstream steps.

Example 2

Microbial suspensions from *Staphylococcus aureus*, *Candida albicans*, and *Haemophilus influenzae* were prepared from colonies of microbial pure cultures. Colony was suspended to PBS and, by diluting, the OD value was adjusted to 0.5 McF. 104 cfu/ml suspension was prepared and centrifuged for removal of possible free DNA. After dissolving the pellet, 1000 cfu/ml suspension was prepared to be used in blood sample spiking. The suspension was also plated for culturing to determine exact final concentration.

4 ml of blood was spiked with studied microbes to 10 cfu/ml concentration. The blood was admixed with equal volume of a lysis solution containing 4M guanidine hydrochloride, 4% (v/v) Tween 20, 4% (w/v) saponin, 40.5 mM Tris. Using a syringe, the resulting lysate was filtered through a syringe filter with 0.22 µm pore size.

A second lysis solution containing 85 mM sodium hydroxide, 18% (v/v) DMSO, 7% (v/v) glycerol, 1 mM EDTA, 7.5 mM Tris was used for washing the filter by filtering 15 ml of the solution through. The solution was left on the filter and the filter was incubated in filter heating block at 92° C. for 5 min After incubation, the filter was let to cool for 3 minutes before pushing 2 ml of mineral oil through the filter. This removed the second lysis solution with freed DNA from the filter, as eluate.

Approximately 200 µl of eluate was separated from immiscible liquid, neutralized with 20× neutralizing solution (500 mM HCl, 50 mM Tris) and ran in qPCR with 5 replicates, using target specific assays. 4/5 replicates became positive for *C. albicans* with average Cq value 40.2, 4/5 became positive for *S. aureus* with av Cq value 38.1 and 5/5 of *H. influenzae* became positive with average Cq value 37.6.

Example 3

Microbial suspensions from *Staphylococcus aureus*, *Candida albicans*, and *Hemophilus influenzae* were prepared from colonies of microbial pure cultures. Colony was suspended to PBS and by diluting, the OD value was adjusted to 0.5 McF. 104 cfu/ml suspension was prepared and centrifuged for removal of possible free DNA. After dissolving the pellet, 1000 cfu/ml suspension was prepared to be used in blood sample spiking. The suspension was also plated for culturing to determine exact final concentration.

4 ml of blood was spiked with studied microbes to 30 and 15 cfu/ml concentration. The blood was admixed with equal volume of a lysis solution containing 4M guanidine hydrochloride, 4% (v/v) Tween 20, 4% (w/v) saponin, 40.5 mM Tris. Using a syringe, the resulting lysate was filtered through a syringe filter with 0.22 um pore size. The experiments were done in duplicates.

A second lysis solution containing 85 mM sodium hydroxide, 7% (v/v) glycerol, 1 mM EDTA, 7.5 mM Tris was tested both without DMSO and with 20% (v/v) DMSO added. The second lysis solution was used for washing the filter by filtering 15 ml of the solution through. The solution was left on the filter and the filter was incubated in oven for 20 min at 90° C.

After incubation, the filter was let to cool for few minutes before pushing 2 ml of mineral oil through the filter, co-directionally. This removed the second lysis solution with freed DNA from the filter, as eluate.

Approximately 200 µl of eluate was separated from immiscible liquid, neutralized with 20× neutralizing solution (500 mM HCl, 50 mM Tris), and ran in qPCR with 10 replicates, using target specific assays. The results are shown in Table 2 below.

TABLE 2

| | Average Cqs (No. of Positive) | | |
| --- | --- | --- | --- |
| | C. albicans | S. aureus | H. influenzae |
| 1) 30 CFU/ml with 20% DMSO in GENT wash/lysis | 38.7 (7/10) | 39.0 (7/10) | 36.3 (10/10) |
| 2) 30 CFU/ml with 20% DMSO in GENT wash/lysis | 38.0 (9/10) | 38.4 (7/10) | 36.5 (10/10) |
| 3) 30 CFU/ml with GENT wash/lysis | 39.2 (3/10) | 38.7 (4/10) | 36.2 (10/10) |
| 4) 30 CFU/ml with GENT wash/lysis | 39.2 (2/10) | 39.3 (4/10) | 36.3 (10/10) |
| 5) 15 CFU/ml with 20% DMSO in GENT wash/lysis | 38.8 (9/10) | 38.1 (3/10) | 37.0 (10/10) |
| 6) 15 CFU/ml with 20% DMSO in GENT wash/lysis | 39.4 (6/10) | 39.0 (5/10) | 37.5 (9/10) |
| 7) 15 CFU/ml with GENT wash/lysis | 39.3 (1/10) | 39.0 (3/10) | 37.5 (9/10) |
| 8) 15 CFU/ml with GENT wash/lysis | 39.1 (2/10) | 38.9 (3/10) | 37.4 (10/10) |
| Pos Control-150 CFU/ml cell lysate (GENT) | 39.1 (8/8) | 40.0 (2/8) | 37.0 (8/8) |
| NTC | — | — | — |

From the results it is seen that adding DMSO had clear beneficial effect on both *C. albicans* and *S. aureus*. *C. albicans* Cq value and PCR replicate positivity (PCR replicates from the same eluate) were improved using DMSO (compare conditions 1 and 2 to 3 and 4 (with 30 cfu/mL spike) and conditions 5 and 6 to 7 and 8 (with 15 cfu/mL spike)). Also, some improving effect was observed with *S. aureus* (especially when comparing conditions 1 and 2 to 3 and 4). These results for *Candida* and *S. aureus* were not expected. *H. influenzae* on the other hand did not show improvements in Cq values, indicating that the more sensitive microbe for lysis is already efficiently lysed without the help of DMSO.

Example 4

Within enrichment protocol development, it was seen that some of the Gram-positive microbes are more tolerant to lysis and require protocol optimization. Thus, enzymatic treatment for better degradation of cell wall components (e.g., peptidoglycan) was included to the enrichment protocol.

Microbial suspensions from (A) *Haemophilus influenzae*, (B) *Listeriae monocytogenes*, (C) *Candida albicans*, (D) *Streptococcus pneumoniae*, (E) *Streptococcus agalactiae*, (F) *Stenotrophomonas maltophilia*, (G) *Enterococcus faecium* and (H) *Staphylococcus aureus* were prepared from colonies of microbial pure cultures. Colonies were suspended to PBS to high concentration, centrifuged for free DNA removal and after resuspending the pellet to fresh PBS the OD value was adjusted to 0.5 McF. 104 cfu/ml suspension was prepared to be used in blood sample spiking.

4 ml of blood was spiked with studied microbes to 20 cfu/ml concentration. The blood was admixed with an equal volume of a lysis solution containing 4M guanidine hydrochloride, 4% (v/v) Tween 20, 4% (w/v) saponin, 40.5 mM Tris. Using a syringe, the resulting lysate was filtered through a syringe filter with 0.22 µm pore size.

A diluted second lysis solution (3.5% (v/v) glycerol, 0.5 mM EDTA, 42.5 mM sodium hydroxide, 10 mM Tris, and 9% (v/v) DMSO) was used for washing the filter by filtering 15 ml of the solution through.

1 ml of 500 U/ml mutanolysin solution was added through the syringe filter.

The filter was incubated with mutanolysin solution at room temperature for 15 minutes.

Concentrated second lysis solution was added to the filter in such volume (100 µl) which was not able to push possibly freed analytes from the filter and which diluted the lysis solution concentrations inside the filter to 20 mM sodium hydroxide, 18% (v/v) DMSO, 7% (v/v) glycerol, 1 mM EDTA, 7.5 mM Tris in the reaction.

The filter was placed on induction heater and incubation with maximum temperature of 110° C. for 8 min was done.

After incubation, the filter was let to cool for 3 minutes before pushing 2 ml of mineral oil through the filter. This removed the second lysis solution with freed DNA from the filter, as eluate.

Approximately 200 µl of eluate was separated from immiscible liquid, and ran in qPCR with replicates, using target specific assays.

Positive control was prepared to the concentration expected to also be in the eluates after successful enrichment (i.e., ~10× enrichment from initial sample), by using MagNA Lyser instrument (Roche Diagnostics), which automatically disrupts cells by bead beating. Results are shown in Table 3 below.

TABLE 3

20 cfu/ml spiked sample

Average Cqs (No. of pos)

| | (A) | (B) | (C) | (D) | (E) | (F) | (G) | (H) |
|---|---|---|---|---|---|---|---|---|
| 1 | 35.5 (3/3) | 35.8 (3/3) | 33.4 (3/3) | 36.1 (3/3) | 36.9 (3/3) | 35.4 (3/3) | 37.8 (2/3) | 36.9 (3/3) |
| 2 | 35.5 (6/6) | 35.6 (6/6) | 33.2 (6/6) | 34.7 (6/6) | 34.6 (6/6) | 36.4 (6/6) | 37.9 (3/6) | 36.9 (6/6) |
| 200 cfu/ml positive control | 34.8 (8/8) | 35.3 (8/8) | 30.4 (8/8) | 36.0 (8/8) | 35.8 (8/8) | 37.9 (8/8) | 35.7 (8/8) | 35.6 (8/8) |
| Negative eluate | — | — | — | — | — | — | — | — |

From the results it is seen that, after enrichment, most of the studied targets reach a Cq-value similar to that of the 200 cfu/ml positive control. *C. albicans*, which is not affected by mutanolysin, is left approximately 3 Cqs behind from positive control result. Still, the PCR positivity rate of the yeast from 20 cfu/ml spiked initial sample is 100%. From the tested targets, *E. faecium*, which should get affected by mytanolysin, needs further protocol optimization for optimal lysis. Overall, addition of mutanolysin step improved gram-positive microbe's detection to similar Cq levels with positive control.

2) Take the PBS sample into a 10 ml syringe by using a syringe needle. Attach the syringe to the filter inlet. Filter the sample through.
3) Wash the filter by filtering through 13 ml of GENT lysis solution or solution under study at ~20 ml/min speed.
4) Cap the filter and place it to oven at 90° C. for 20 minutes.
5) Elute by connecting 1 ml syringe filled with mineral oil directly to upper inlet (for co-directional elution) and press it through steadily with low speed.
6) Separate the lower liquid phase (containing the lysis solution and microbial DNA) by using a needle attached to a 1 ml syringe and transfer it into a new tube.
7) Neutralize the eluate by adding 20× Neutralizer (500 mM HCl, 50 mM Tris) and checking the pH with pH test strips. Aim for pH 8.5. (Approximately 50 µl of 20× Neutralizer needed for 250 µl of eluate.)

Results are shown in Table 4 below.

TABLE 4

| | C. albicans | | H. influenzae | |
|---|---|---|---|---|
| Test Solution | 58° C. annealing | 55° C. annealing | 58° C. annealing | 55° C. annealing |
| 1) 40% DMSO in water (from 40 cfu/ml) | — | — | — | — |
| 2) 40% DMSO in 85 mM NaOH (from 40 cfu/ml) | — | — | 37.6 (6/6) | 37.4 (6/6) |
| 3) 40% DMSO in GENT (from 40 cfu/ml) | 39.4 (4/6) | 39.5 (5/6) | 38.6 (5/6) | 38.2 (4/6) |
| 4) 20% DMSO in water (from 40 cfu/ml) | — | — | — | — |
| 5) 20% DMSO in 85 mM NaOH (from 40 cfu/ml) | 39.3 (2/6) | 39.2 (1/6) | 36.4 (6/6) | 36.9 (6/6) |
| 6) 20% DMSO in GENT (from 40 cfu/ml) | 38.2 (5/6) | 37.9 (5/6) | 36.7 (6/6) | 37.2 (6/6) |
| Pos control = 150 cfu/ml cell lysate (GENT) | 37.9 (6/6) | 37.7 (5/6) | 37.4 (5/6) | 37.2 (6/6) |
| NTC | — | — | — | — |

Example 5

A pathogen enrichment protocol was evaluated using microbial cell lysis under three separate conditions: (1) DMSO alone (in water); (2) DMSO in 85 mM NaOH; and (3) DMSO in "GENT" lysis solution (85 mM NaOH, 7% glycerol, 1 mM EDTA, 7.5 mM Tris). DMSO was tested at 20% (v/v) and 40% (v/v) for each of conditions (1)-(3) (for a total of six different test solutions).

The protocol used in this study is summarized below.
1) Take 4 ml of PBS sample to 50 ml falcon tube. (Spike centrifuged (9500 rpm/min, 10 min)+washed pathogens to 30 cfu/ml (12 µl from 10^4 cfu/ml stock), mix gently.

Results show that a DMSO concentration of 40% was not capable of lysing *C. albicans* alone in water or in 85 mM NaOH. *H. influenzae* was always lysed in presence of NaOH. When 40% DMSO was in solution containing both glycerol and NaOH (GENT), some detectivity was seen also with *Candida*.

With 20% DMSO in water, the cells were not lysed whereas in 20% DMSO with 85 mM NaOH, detection was seen. When 20% DMSO was in a solution containing glycerol and NaOH (GENT), detection was well improved with *Candida*.

40% DMSO in GENT seems to be inhibitory in PCR (or require PCR optimization) as compared to 20% DMSO in GENT.

Example 6

A pathogen enrichment protocol with induction heating was evaluated using lysis solution with or without DMSO. The base lysis solution (GENT) contained 85 mM NaOH, 7% glycerol, 1 mM EDTA, 7.5 mM Tris. DMSO was used at a concentration of 18% (v/v).

The protocol used in this study is summarized below.
1) Mix blood sample well by inverting tube>30 times.
2) Take 4 ml of blood sample to 50 ml falcon tube. (Spike centrifuged (9500 rpm/min, 10 min)+washed pathogens to 50 cfu/ml (20 μl from 10^4 cfu/ml stock), mix gently.
3) Add 4 ml of hemolysis solution (4 M Gu-HCl, 4% Tween-20 (v/v), 4% saponin, 40.5 mM Tris-HCl) and mix 25 times by slowly pipetting back and forth.
4) Take the lysed blood sample into a 10 ml syringe by using a syringe needle. Remove air completely. Attach the syringe to the filter directly in a 90° angle. Filter the blood through.
5) Wash the filter by filtering through 15 ml of GENT-solution at ~20 ml/min speed.
6) Cap the filter and place it to filter heating holder. The following induction heating protocol was run: heat filter to 50° C. and keep it for 40 seconds; increase heat to 70° C. and keep it for 20 seconds; increase the heat to 90° C. and keep it for 5 minutes. Let cool for few minutes, then remove from heating holder.
7) Elute by connecting 1.2 ml syringe with mineral oil to the filter inlet and steadily press the oil through the filter.
8) Separate the lower phase of miscible liquid from oil.
9) Neutralize the eluate by adding 20× Neutralizer (500 mM HCl, 50 mM Tris) and checking the pH with pH test strips. Aim for pH 8.5. (Approximately 40 μl of 20× Neutralizer needed for 250 μl of eluate.)

Results are shown in Table 5 below.

TABLE 5

| Test Condition | Average Cqs (No. of pos) | |
| --- | --- | --- |
| | C. albicans | S. agalactiae |
| #1: 50 cfu/ml spike. GENT | 41.4 (8/8) | — |
| #2: 50 cfu/ml spike. GENT (with 18% DMSO) | 38.4 (8/8) | — |
| Pos control = 500 cfu/ml cell lysate (GENT) | 35.9 (8/8) | 38.8 (3/8) |
| gDNA 5 cp/PCR reaction control | 37.4 (7/8) | 37.3 (7/8) |
| NTC (TE-buffer) | — | — |

Results show a clear improvement in *Candida albicans* detection (3 Cqs) when 18% DMSO was added to GENT solution (compare #1 and #2).

Example 7

A pathogen enrichment protocol with sonication was evaluated using lysis solution containing DMSO either in the presence or absence of NaOH. The lysis solution with NaOH (GENTD) contained 85 mM NaOH, 18% DMSO, 7% glycerol, 1 mM EDTA, 7.5 mM Tris.

The protocol used in this study is summarized below.
1) Take 4 ml of blood to 50 ml falcon tube. Add pathogens to 50 cfu/ml (20 μl from 10^4 cfu/ml stock), mix gently.
2) Take the sample into a 10 ml syringe by using a syringe needle. Attach the syringe to the filter inlet. Filter the blood through.
3) Wash the filter by filtering through 15 ml of relevant GENTD solution or TE buffer (10 mM Tris, 1 mM EDTA) at ~20 ml/min speed.
4) Cap the filter and sonicate using a sonotrode for the filter: Be certain to make identical, tight connection of the filter to the sonotrode.
5) Elute by connecting 2 ml syringe filled with silicone oil (polydimethylsiloxane, trimethylsiloxy terminated) directly to upper inlet (for co-directional elution) and press it through steadily with low speed.
6) Separate the lower liquid phase (containing the lysis solution and microbial DNA) by using a needle attached to a 1 ml syringe and transfer it into a new tube.
7) Neutralize the eluate by adding 20× Neutralizer (500 mM HCl, 50 mM Tris) and checking the pH with pH test strips. Aim for pH 8.5. (Approximately 50 μl of 20× Neutralizer needed for 250 μl of eluate.)

Results are shown in Table 6 below.

TABLE 6

| Test Condition | Average Cqs (No. of pos) | | | |
| --- | --- | --- | --- | --- |
| | H. influenzae | E. faecium | C. albicans | S. agalactiae |
| 1) GENTD only | 34.7 (5/5) | 38.4 (4/5) | 37.7 (5/5) | 38.7 (5/5) |
| 2) GENTD only | 34.7 (5/5) | 41.4 (2/5) | 37.1 (5/5) | 38.9 (5/5) |
| 3) GENTD w/o NaOH | 39.3 (4/5) | — | — | 39.2 (2/5) |
| 4) GENTD w/o NaOH | — | — | — | — |
| 5) TE buffer | — | — | 39.1 (1/5) | — |
| 6) TE buffer | 37.7 (5/5) | — | — | — |
| Pos 500 cfu/ml | 34.2 (4/4) | 35.3 (4/4) | 35.1 (4/4) | 35.1 (4/4) |
| Neg eluate | — | — | — | — |

The results show the importance of NaOH in the lysis solution even when a stronger mechanical lysis method is used. Easy-to-lyse *H. influenza* was poorly or inefficiently lysed (#3 and #6) or was not lysed at all (#4 and #5) without NaOH.

From the foregoing, it will be appreciated that, although specific embodiments of the invention have been described herein for purposes of illustration, various modifications may be made without deviating from the spirit and scope of the invention. All publications, patents, and patent applications cited herein are hereby incorporated by reference in their entireties for all purposes.

The embodiments of the invention in which an exclusive property or privilege is claimed are defined as follows:

1. A method for selectively isolating a microbial cell analyte from a sample, the method comprising:
   (a) providing a sample containing mammalian cells and potentially containing microbial cells;
   (b) mixing the sample with a first lysis solution that selectively lyses the mammalian cells to obtain a first lysate containing lysed mammalian cells and intact microbial cells, if present, wherein the first lysis solution a buffered solution comprising a chaotropic salt that is guanidine hydrochloride, and a detergent that is saponin;
   (c) filtering the first lysate through a filter having a pore size that retains the intact microbial cells, wherein the pore size from about 0.1 μm to about 1 μm;
   (d) contacting the filter containing the retained microbial cells with a second lysis solution that is effective to lyse the microbial cells and release therefrom an analyte, wherein the second lysis solution is a buffered solution comprising sodium hydroxide at a concentration of from about 50 mM to about 100 mM, dimethyl sulfoxide (DMSO) at a concentration of from about 10% (v/v) to about 25% (v/v), glycerol at a concentration of from about 3% (v/v) to about 10% (v/v);

(e) providing conditions for lysing the retained microbial cells in the second lysis solution whereby at least a portion of the microbial cells are lysed and the analyte released therefrom; and (f) eluting the analyte from the filter to obtain an eluate comprising isolated analyte.

2. The method of claim 1, wherein the microbial cells are bacterial cells and/or yeast cells.

3. The method of claim 1, wherein the filter comprises polyethersulfone (PES), cellulose, nylon, polyvinylide fluoridene (PVDF), polycarbonate, or glass fiber, and/or wherein the filter comprises an asymmetric structure, and/or wherein pores on a first side of the asymmetric filter have a size from about 5 µm to about 20 µm and pores on a second side of the asymmetric filter have a size of up to about 0.2 µm.

4. The method of claim 3, wherein the filter comprises polyethersulfone (PES).

5. The method of claim 1, wherein between steps (b) and (c) or between steps (c) and (d) the method further comprises an enzymatic treatment step comprising contacting the filter containing the retained microbial cells with an enzyme solution containing at least one enzyme that is effective to degrade one or more microbial cell wall components, wherein the at least one enzyme is preferably a mutanolysin, a lyticase, or a lysozyme.

6. The method of claim 1, wherein the first lysis solution further comprises a second detergent that is polysorbate 20, optionally wherein polysorbate 20 is present in the first lysis solution at a concentration of from about 1% (v/v) to about 10% (v/v).

7. The method of claim 1, wherein
guanidine hydrochloride is present in the first lysis solution at a concentration of from about 1 M to about 8 M, and/or
saponin is present in the first lysis solution at a concentration of from about 1% (w/v) to about 10% (w/v), and/or
wherein the first lysis solution is buffered with from about 20 mM to about 200 mM of a Tris buffer, and/or
wherein the second lysis solution is buffered with from about 1 mM to about 50 mM of a Tris buffer.

8. The method of claim 1, wherein the second lysis solution further comprises a chelating agent,
optionally wherein the chelating agent in the second lysis solution is 2,2',2'',2'''-(Ethane-1,2-diyldinitrilo)tetraacetic acid (EDTA) and is present at a concentration of from about 0.1 mM to about 4 mM or from about 0.5 mM to about 2 mM.

9. The method of claim 1, wherein the volume of the sample provided at step (a) is from about 0.5 mL to about 5 mL.

10. The method of claim 1, wherein the sample is a blood sample.

11. The method of claim 1, wherein during the mixing step (b) the ratio of the first lysis solution to the sample is about 1:1.

12. The method of claim 1, wherein the conditions for lysing at step (e) comprise incubating the filter with the second lysis solution at an incubation temperature of from about 80° C. to about 150° C., more preferably from about 90° C. to about 130° C.

13. The method of claim 1, wherein the conditions for lysing at step (e) comprise sonication.

14. The method of claim 1, wherein the eluting step (f) comprises passing an immiscible liquid through the filter to push the eluate comprising the analyte out of the filter, wherein the immiscible liquid is selected from the group consisting of oils and hydrocarbons.

15. The method of claim 1, wherein the direction of fluid flow through the filter in the eluting step (f) is the same as the direction of fluid flow applied in the filtering step (c).

16. The method of claim 1, wherein the direction of fluid flow through the filter in the eluting step (f) is opposite the direction of fluid flow applied in the filtering step (c).

17. The method of claim 1, further comprising (g) adding a neutralizing buffer to the eluate obtained in step (f), wherein the neutralizing buffer comprises hydrochloric acid (HCl) and Tris; and/or further comprising a washing step between steps (c) and (d), wherein the washing step comprises flowing a wash buffer through the filter.

18. The method of claim 1, wherein the analyte is a nucleic acid.

19. The method of claim 1, further comprising analyzing the isolated analyte, and, optionally, wherein the analyte is a nucleic acid, analyzing the isolated nucleic acid analyte, the analyzing method comprising (i) performing a nucleic acid amplification reaction using the isolated nucleic acid as a template to generate an amplification product; and (ii) detecting the amplification product.

20. The method of claim 19, wherein analyzing the isolated nucleic acid comprises immobilizing the isolated nucleic acid or amplification product on a solid support.

21. A lysis solution comprising:
sodium hydroxide at a concentration of from about 50 mM to about 100 mM,
dimethyl sulfoxide (DMSO) at a concentration of from about 10% (v/v) to about 25% (v/v),
glycerol at a concentration of from about 3% (v/v) to about 10% (v/v), and
a buffer.

22. The lysis solution of claim 21, further comprising a chelating agent.

23. The lysis solution of claim 22, wherein the chelating agent is 2,2',2'',2'''-(Ethane-1,2-diyldinitrilo)tetraacetic acid (EDTA) and is present at a concentration of from about 0.1 mM to about 4 mM,
optionally wherein the EDTA is present at a concentration of from about 0.5 mM to about 2 mM.

24. The lysis solution of claim 21, wherein the buffer is Tris and is present at a concentration of from about 1 mM to about 50 mM,
optionally wherein Tris is present at a concentration of from about 5 mM to about 10 mM.

* * * * *